(12) United States Patent
Zhang et al.

(10) Patent No.: US 12,342,258 B2
(45) Date of Patent: Jun. 24, 2025

(54) INITIATION METHOD AND APPARATUS, RESELECTION METHOD AND APPARATUS, DEVICE, AND STORAGE MEDIUM

(71) Applicant: ZTE CORPORATION, Shenzhen (CN)

(72) Inventors: Boyuan Zhang, Shenzhen (CN); Mengzhen Wang, Shenzhen (CN); Xueying Diao, Shenzhen (CN); Lin Chen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 367 days.

(21) Appl. No.: 17/918,041

(22) PCT Filed: Apr. 9, 2021

(86) PCT No.: PCT/CN2021/086085
§ 371 (c)(1),
(2) Date: Oct. 10, 2022

(87) PCT Pub. No.: WO2021/204232
PCT Pub. Date: Oct. 14, 2021

(65) Prior Publication Data
US 2023/0141478 A1 May 11, 2023

(30) Foreign Application Priority Data
Apr. 9, 2020 (CN) .......................... 202010274768.3

(51) Int. Cl.
*H04W 40/22* (2009.01)
*H04W 36/00* (2009.01)
(Continued)

(52) U.S. Cl.
CPC ..... *H04W 40/22* (2013.01); *H04W 36/00837* (2018.08); *H04W 36/033* (2023.05);
(Continued)

(58) Field of Classification Search
CPC ........... H04W 40/22; H04W 36/00837; H04W 36/033; H04W 48/08; H04W 36/037;
(Continued)

(56) References Cited

U.S. PATENT DOCUMENTS 11,716,786 B2 * 8/2023 Lee .................. H04W 88/04
370/329
2016/0100353 A1 4/2016 Gleixner
(Continued)

FOREIGN PATENT DOCUMENTS

| CN | 106470491 A | 3/2017 |
| CN | 106576390 A | 4/2017 |

(Continued)

OTHER PUBLICATIONS

First Search Report in Chinese Application No. 2020102747683, dated Jul. 19, 2024, 9 pages, including translation.
(Continued)

*Primary Examiner* — Mohammad S Anwar
(74) *Attorney, Agent, or Firm* — Morgan, Lewis & Bockius LLP

(57) ABSTRACT

Provided are an initiation method and apparatus, a reselection method and apparatus, a device, and a storage medium. The initiation method is applied to a first communication node, where the first communication node is in a connected state, an idle state or an inactive state, and includes: receiving relay function configuration information sent by a second communication node; and initiating, according to a comparison result of the relay function configuration information and a first current parameter value, a relay function corresponding to the comparison result, where the first current parameter value includes a measurement value and a traffic priority.

19 Claims, 3 Drawing Sheets

Receive relay function configuration information sent by a second communication node — S110

Initiate, according to a comparison result of the relay function configuration information and a first current parameter value, a relay function corresponding to the comparison result — S120

(51) Int. Cl.
*H04W 36/30* (2009.01)
*H04W 36/32* (2009.01)
*H04W 48/08* (2009.01)

(52) U.S. Cl.
CPC .......... *H04W 48/08* (2013.01); *H04W 36/037* (2023.05); *H04W 36/302* (2023.05); *H04W 36/322* (2023.05)

(58) Field of Classification Search
CPC . H04W 36/302; H04W 36/322; H04W 36/08; H04W 4/40; H04W 76/27; H04W 48/12; H04W 48/20; H04W 88/04; H04W 92/18; H04W 40/12; H04W 40/24; H04W 36/0085; Y02D 30/70
See application file for complete search history.

(56) References Cited

U.S. PATENT DOCUMENTS

| | | | |
|---|---|---|---|
| 2016/0381720 | A1 | 12/2016 | Baek et al. |
| 2017/0347338 | A1* | 11/2017 | Chen ............... H04W 72/30 |
| 2017/0359766 | A1 | 12/2017 | Agiwal et al. |
| 2018/0098370 | A1* | 4/2018 | Bangolae ............ H04W 88/04 |
| 2019/0028962 | A1 | 1/2019 | Chun |
| 2020/0052774 | A1 | 2/2020 | Basu Mallick et al. |

FOREIGN PATENT DOCUMENTS

| | | |
|---|---|---|
| CN | 107113916 A | 8/2017 |
| CN | 107637162 A | 1/2018 |
| CN | 108632919 A | 10/2018 |
| CN | 109479224 A | 3/2019 |
| CN | 110536316 A | 12/2019 |
| CN | 110692279 A | 1/2020 |
| CN | 111901840 A | 11/2020 |
| EP | 3618555 A1 | 4/2020 |
| JP | 2018520525 A | 7/2018 |
| WO | WO-2016181547 A1 | 11/2016 |

OTHER PUBLICATIONS

First Office Action in Chinese Application No. 202102747683 dated Jul. 22, 2024, 12 pages, including translation.
Indian Office Action in Application No. 202227063730, dated Mar. 3, 2023, 8 pages.
International Search Report in Application No. PCT/CN2021/086085, dated Jun. 30, 2021, 4 pages, including English Translation.
ZTE, "Relay UE Selection and Reselection", 3GPP TSG-RAN WG2 Meeting #91bis R2-154695, Oct. 9, 2015, 4 pages.
Partial Supplementary European Search Report of Application No. 21785687.1, dated Mar. 19, 2024, 11 pages.
Office Action in Japanese Application No. 2022-560225, dated Oct. 31, 2023, 22 pages including translation.
Qualcomm Incorporated, "Use of RACH for transition from Uu to Un operation on DeNB-RN link", 3GPP TSG RAN WG2 #69bis, R2-102401, Beijing, China, Apr. 12-16, 2010.
Intel Corporation, "Considerations for UE-to-Network relay selection and reselection", 3GPP TSG RAN WG2 Meeting #90, R2-152224, Fukuoka, Japan, May 25-29, 2015.
Sony, "Scope and phasing of D2D Relay enhancements", 3GPP TSG RAN WG2 Meeting #94, R2-163936, Nanjing, China, May 23-27, 2016.
First Office Action in Korean Application No. 10-2022-7039245 dated Jan. 17, 2025, 16 pages including transmittal.

* cited by examiner

INITIATION METHOD AND APPARATUS, RESELECTION METHOD AND APPARATUS, DEVICE, AND STORAGE MEDIUM

CROSS REFERENCE TO RELATED APPLICATIONS

This is a National Stage Application filed under 35 U.S.C. 371 based on International Patent Application No. PCT/CN2021/086085, filed on Apr. 9, 2021, which claims priority to Chinese Patent Application No. 202010274768.3 filed on Apr. 9, 2020, disclosures of both of which are incorporated herein by reference in their entireties.

TECHNICAL FIELD

The present application relates to the field of communications, for example, to an initiation method and apparatus, a reselection method and apparatus, a device, and a storage medium.

BACKGROUND

In the field of wireless communications, with the rapid development of smart terminals and mobile Internet applications, higher and higher requirements have been proposed for user experience, high rate, and large data volume, and thus, sidelink technology, which represents the new development direction of future communication technology, came into being. Sidelink technology can be applied in licensed frequency bands or unlicensed frequency bands and allow multiple user equipments (UEs) supporting sidelink functions to perform direct discovery/direct communication with or without network coverage.

In the process of sidelink communication, as UEs move, the relative distance between UEs which are in sidelink communication may change so that sidelink communication is no longer suitable for the UEs, or a UE returns to the coverage of a network and does not need to forward data through a sidelink relay. In addition, when two UES that are communicating with each other via cellular find that they are getting closer to each other, the two UEs want to switch data communication from cellular to sidelink to reduce the load of the cellular network and reduce the transmission delay. In these cases, the traffic flow between sidelink UEs is required to be switched between a sidelink path and a cellular path. In the process of traffic flow switching, service continuity needs to be guaranteed so that users will not feel the degradation of communication service quality. Therefore, how to selectively initiate and reselect a relay UE is an urgent problem to be solved.

SUMMARY

Embodiments of the present application provide an initiation method and apparatus, a reselection method and apparatus, a device, and a storage medium, to achieve the selective initiation and reselection of the relay UE.

An embodiment of the present application provides an initiation method. The initiation method is applied by a first communication node, where the first communication node is in a connected state, an idle state or an inactive state, and includes the following.

Relay function configuration information sent by a second communication node is received; and according to a comparison result of the relay function configuration information and a first current parameter value, a relay function corresponding to the comparison result is initiated, where the first current parameter value includes a current measurement value and a current traffic priority.

An embodiment of the present application further provides an initiation method. The initiation method is applied by a second communication node and includes the following.

Relay function configuration information is configured for a first communication node; and the relay function configuration information is sent to the first communication node; where the relay function configuration information is used for triggering the first communication node to initiate a relay traffic transmission function.

An embodiment of the present application further provides a reselection method. The reselection method is applied by a third communication node and includes the following.

A second current parameter value of a current first communication node which currently is in communication is detected; and reselection is performed on the current first communication node according to the second current parameter value.

An embodiment of the present application further includes an initiation apparatus. The initiation apparatus is applied by a first communication node and includes a receiver and an initiator.

The receiver is configured to receive relay function configuration information sent by a second communication node. The initiator is configured to initiate, according to a comparison result of the relay function configuration information and a first current parameter value, a relay traffic transmission function corresponding to the comparison result, where the first current parameter value includes a current measurement value and a current traffic priority.

An embodiment of the present application further provides an initiation apparatus. The initiation apparatus is applied by a second communication node and includes a first configuration module and a sender.

The first configuration module is configured to configure relay function configuration information for a first communication node, and the sender is configured to send the relay function configuration information to the first communication node, where the relay function configuration information is used for triggering the first communication node to initiate a relay traffic transmission function.

An embodiment of the present application further provides a reselection apparatus. The reselection method is applied by a third communication node and includes a first detector and a first reselector.

The first detector is configured to detect a second current parameter value of a current first communication node which currently is in communication. The first reselector is configured to perform reselection on the current first communication node according to the second current parameter value.

An embodiment of the present application further provides a device. The device includes a communication module, a memory, and one or more processors. The communication module is configured to perform communication interaction among a first communication node, a second communication node, and a third communication node. The memory is configured to store one or more programs, and the one or more programs, when executed by the one or more processors, enable the one or more processors to perform the method described in any one of the preceding embodiments.

An embodiment of the present application further provides a storage medium. The storage medium stores a computer program, and the computer program, when executed by a processor, performs the method described in any one of the preceding embodiments.

DETAILED DESCRIPTION

The embodiments of the present application are described below in conjunction with drawings.

Sidelink technology includes sidelink discovery technology and sidelink communication technology. Sidelink discovery technology refers to the technology for deciding/determining whether two or more sidelink UEs are getting closer to each other (for example, within a range where sidelink direct communication may be performed) or deciding/determining whether a first UE is getting closer to a second UE. Sidelink UEs may discover each other by sending or receiving discovery signals/information, and with the coverage of a cellular network, the network may assist sidelink UEs in sidelink discovery. Sidelink communication technology refers to the technology where part or all of the communication data between sidelink UEs does not need to go through the network infrastructure and the sidelink UEs can directly communicate with each other.

Figure 1:
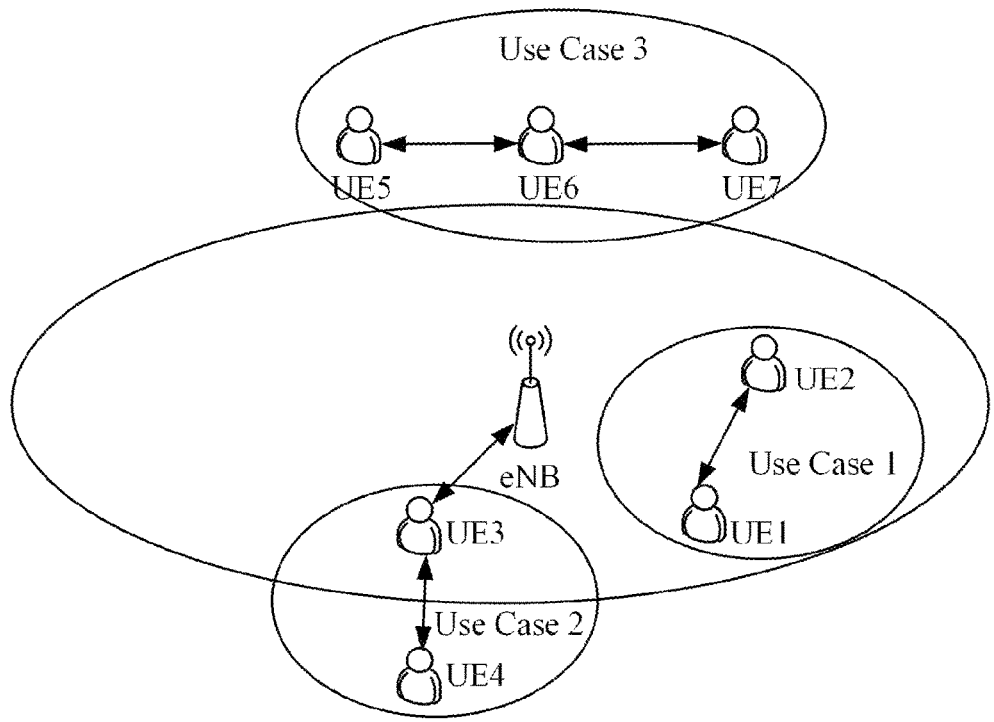
FIG. 1 is a schematic diagram of sidelink communication according to an embodiment of the present application.

Sidelink technology can be applied in licensed frequency bands or unlicensed frequency bands and allows multiple UEs supporting sidelink functions to perform direct discovery/direct communication with or without network coverage. FIG. 1 is a schematic diagram of sidelink communication according to an embodiment of the present application. Sidelink has three main application use cases described below.

The first application use case is that UE1 and UE2 perform sidelink discovery or sidelink communication under the coverage of a cellular network, and user plane data does not pass through a network infrastructure. As shown in Use Case 1 in FIG. 1, Use Case 1 may include two branches a) and b) described below.

A) Sidelink discovery: It may be divided into open sidelink discovery and limited sidelink discovery.

B) Sidelink communication: It may be divided into sidelink broadcast communication, sidelink multicast communication, and sidelink unicast communication.

The second application use case is that in UE-to-network (U2N) relay transmission in an area of weak/no coverage, for example, in Use Case 2 in FIG. 1, UE4 with poor signal quality is allowed to communicate with a network through nearby UE3 with network coverage to help operators to expand coverage and increase capacity.

The third application use case is that in a case where a cellular network cannot work normally due to an earthquake or an emergency, multi-hop communication (UE-to-UE (U2U) relay) between devices is allowed, for example, in Use Case 3 in FIG. 1, control planes and user planes of UE5, UE6 and UE7 do not go through network infrastructure and UE5, UE6 and UE7 perform one-hop or multi-hop data communication.

Service continuity: For the sidelink communication in Use Case 1, Use Case 2, and Use Case 3, as the UEs move, the relative distance between UEs which are in sidelink communication may change so that sidelink communication is no longer suitable for the UEs, or a UE returns to the coverage of a network and does not need to forward data through a sidelink relay. In addition, when two UES that are communicating with each other via cellular find that they are getting closer to each other, the two UEs want to switch data communication from cellular to sidelink to reduce the load of the cellular network and reduce the transmission delay. In these cases, the traffic flow between sidelink UEs is required to be switched between a sidelink path and a cellular path. In the process of traffic flow switching, service continuity needs to be guaranteed so that users will not feel the degradation of communication service quality. In view of the above issues, embodiments of the present application provide an initiation method and reselection method for a relay UE, to ensure service continuity and improve the use experience of the user.

Figure 2:
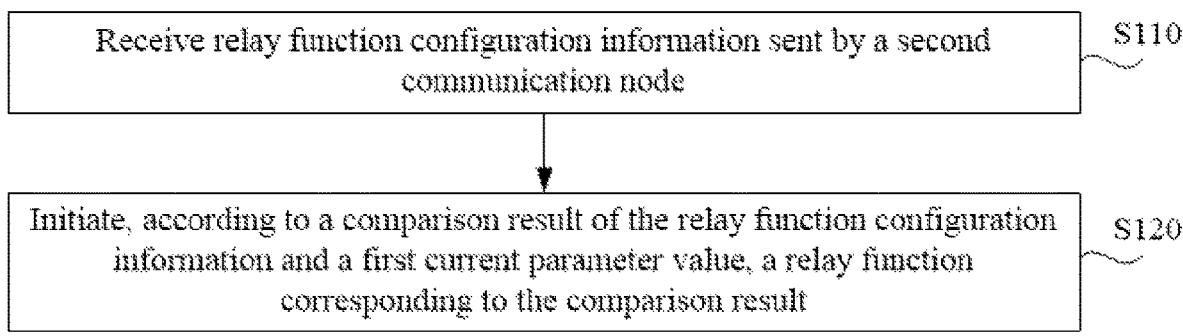
FIG. 2 is a flowchart of an initiation method according to an embodiment of the present application.

In an embodiment, FIG. 2 is a flowchart of an initiation method according to an embodiment of the present application. This embodiment is applied by a first communication node. For example, the first communication node may be a relay UE. As shown in FIG. 2, this embodiment includes S110 and S120 described below.

In S110, relay function configuration information sent by a second communication node is received.

In S120, according to a comparison result of the relay function configuration information and a first current parameter value, a relay function corresponding to the comparison result is initiated, where the first current parameter value includes a current measurement value and a current traffic priority.

In an embodiment, after the first communication node receives the relay function configuration information sent by the second communication node, the first communication node may determine whether to initiate a relay function of the first communication node according to the comparison result between the relay function configuration information and the first current parameter value, thereby ensuring the service continuity. In an embodiment, the second communication node is a network side, for example, a base station or a new radio-radio access network (NR-RAN), and the type of the second communication node is not limited herein. In an embodiment, the relay function configuration information refers to the relevant configuration information of a relay function that the first communication node can support. In an embodiment, the first current parameter value may include a current measurement value and a current traffic priority. The current measurement value may include: a reference signal receiving power (RSRP) measurement value on a Uu interface, a resource pool busy-idle degree measurement value, and a driving speed measurement value. The current traffic priority may include a traffic priority value on the Uu interface and a traffic priority value on a sidelink interface (PC5 interface). The Uu interface refers to the interface between the first communication node and the second communication node.

In an embodiment, the relay function configuration information includes at least one of the following information: U2N relay function configuration information or U2U relay function configuration information. In an embodiment, the U2N relay function configuration information refers to the configuration information corresponding to a U2N relay function supported by the first communication node; the U2U relay function configuration information refers to the configuration information corresponding to a U2U relay function supported by the first communication node.

In an embodiment, in a case where the first communication node is in an idle state or an inactive state for cell selection, the second communication node supporting a relay function is selected.

In an embodiment, the first communication node determines whether the second communication node supports the U2N relay function in at least one of the following manners.

Configuration information related to the U2N relay function is received within a current coverage range of the second communication node, where the configuration information is included in a system information block (SIB) message of vehicle to everything (V2X) or an independent SIB message; indication information indicated in SIB1, SIB2 or SIB4 that a current serving cell supports the U2N relay function is received within the current coverage range of the second communication node; a physical random access channel (PRACH) resource dedicated to the U2N relay function is received within the current coverage range of the second communication node; or an access category and an access identifier dedicated to the U2N relay function are received within the current coverage range of the second communication node.

In an embodiment, a location where the U2N relay function configuration information is included includes one of the following: a SIB message of V2X, a SIB message of a U2U relay function or an independent SIB message. In an embodiment, the SIB message of V2X includes U2N relay function configuration information and U2U relay function configuration information; or, the U2N relay function configuration information and the U2U relay function configuration information are two pieces of independently configured information; or, the U2N relay function configuration information and the U2U relay function configuration information are combined in one SIB message; or, the SIB message of V2X includes that the U2N relay function configuration information and the U2U relay function configuration information are independently configured.

In an embodiment, the first communication node determines whether the second communication node supports the U2U relay function in at least one of the following manners.

Configuration information related to the U2U relay function is received within a coverage range of the current second communication node, where the configuration information is included in a SIB message of V2X, a SIB message of a U2N relay function or an independent SIB message; indication information indicated in SIB1, SIB2 or SIB4 that a current serving cell supports the U2U relay function is received within the coverage range of the current second communication node; a PRACH resource dedicated to the U2U relay function is received within the coverage range of the current second communication node; or an access category and an access identifier dedicated to the U2U relay function are received within the coverage range of the current second communication node.

In an embodiment, a location where the U2U relay function configuration information is included includes one of the following: a SIB message of V2X, a SIB message of a U2N relay function or an independent SIB message. In an embodiment, the SIB message of V2X includes U2N relay function configuration information and U2U relay function configuration information; or, the U2N relay function configuration information and the U2U relay function configuration information are two pieces of independently configured information; or, the U2N relay function configuration information and the U2U relay function configuration information are combined in one SIB message; or, the SIB message of V2X includes that the U2N relay function configuration information and the U2U relay function configuration information are independently configured.

In an embodiment, the initiation method applied by the first communication node further includes: a frequency point supporting a relay function is selected according to a location where the configuration information is included.

In an embodiment, in a case where the relay function configuration information is the U2N relay function configuration information, the operation where the frequency point supporting the relay function is selected according to the location where the configuration information is included includes one of the following.

In a case where the U2N relay function configuration information is included in an independent SIB message, a frequency point supporting the U2N relay function is preferentially selected; in a case where the U2N relay function configuration information is included in the SIB message of V2X, a frequency point supporting both the U2N relay function and NR V2X is preferentially selected.

In an embodiment, in a case where the relay function configuration information is the U2U relay function configuration information, the operation where the frequency point supporting the relay function is selected according to the location where the configuration information is included includes one of the following.

In a case where the U2U relay function configuration information is included in an independent SIB message, a frequency point supporting the U2U relay function is preferentially selected; in a case where the U2U relay function configuration information is included in the SIB message of V2X, a frequency point supporting both the U2U relay function and NR V2X is preferentially selected; in a case where the U2U relay function configuration information is included in the SIB message of the U2N relay function, a frequency point supporting both the U2U relay function and the U2N relay function is preferentially selected; or in a case where the U2U relay function configuration information is included in the SIB message of the U2N relay function and the SIB message of V2X, a frequency point supporting all the U2U relay function, the U2N relay function, and NR V2X is preferentially selected.

In an embodiment, the U2N relay function configuration information includes at least one of the following: an RSRP threshold on a Uu interface; an RSRP threshold on a sidelink interface (PC5 interface); a traffic priority threshold on the Uu interface; a traffic priority threshold on the PC5 interface; a resource pool busy-idle degree threshold; or an absolute speed threshold; where the Uu interface is an interface between the first communication node and the second communication node.

In an embodiment, the operation where, according to the comparison result of the relay function configuration information and the first current parameter value, the relay function corresponding to the comparison result is initiated includes at least one of the following.

The U2N relay function is initiated in a case where an RSRP measurement value on the Uu interface is less than or equal to an RSRP maximum threshold on the Uu interface minus a hysteresis value and/or greater than or equal to an RSRP minimum threshold on the Uu interface plus the hysteresis value; the U2N relay function is initiated in a case where an RSRP measurement value on the PC5 interface is less than or equal to an RSRP maximum threshold on the PC5 interface and greater than or equal to an RSRP minimum threshold on the PC5 interface; the U2N relay function is initiated in a case where all traffic priority values on the Uu interface are greater than or less than the traffic priority threshold on the Uu interface; the U2N relay function is initiated in a case where all non-relay traffic priority values on the PC5 interface are greater than or less than the traffic priority threshold on the PC5 interface; the U2N relay function is initiated in a case where a resource pool busy-idle degree measurement value is less than or greater than the resource pool busy-idle degree threshold; or the U2N relay function is initiated in a case where a traveling speed of the first communication node is less than or greater than the absolute speed threshold.

In an embodiment, the U2U relay function configuration information includes at least one of the following: an RSRP threshold on a Uu interface; an RSRP threshold on a PC5 interface; a traffic priority threshold on the Uu interface; a traffic priority threshold on the PC5 interface; a resource pool busy-idle degree threshold; or an absolute speed threshold.

In an embodiment, the operation where, according to the comparison result of the relay function configuration information and the first current parameter value, the relay function corresponding to the comparison result is initiated includes at least one of the following.

The U2U relay function is initiated in a case where an RSRP measurement value on the Uu interface is less than or equal to an RSRP maximum threshold on the Uu interface minus a hysteresis value and/or greater than or equal to an RSRP minimum threshold on the Uu interface plus the hysteresis value; the U2U relay function is initiated in a case where an RSRP measurement value on the PC5 interface is less than or equal to an RSRP maximum threshold on the PC5 interface and greater than or equal to an RSRP minimum threshold on the PC5 interface; the U2U relay function is initiated in a case where all traffic priority values on the Uu interface are greater than the traffic priority threshold on the Uu interface; the U2U relay function is initiated in a case where all non-relay traffic priority values on the PC5 interface are greater than the traffic priority threshold on the PC5 interface; the U2U relay function is initiated in a case where a resource pool busy-idle degree measurement value is less than the resource pool busy-idle degree threshold; or the U2U relay function is initiated in a case where a traveling speed of the first communication node is less than the absolute speed threshold.

In an embodiment, the first communication node satisfies pre-configured relay UE selection criterion information or relay UE selection criterion information configured by the second communication node.

In an embodiment, the initiation method applied by the first communication node further includes: the relay UE selection criterion information is broadcasted to a third communication node through a discovery message or a direct communication request message.

In an embodiment, in a case where the first communication node supports a U2N relay function, the relay UE selection criterion information includes one of the following: an RSRP measurement value on a PC5 interface is greater than an RSRP threshold value; a current traffic priority on a Uu interface is the highest traffic priority; a current traffic priority on the PC5 interface is the highest priority; domain address indication information in SCI information; a resource scheduling mode is a pre-configured mode; Uu RAT indication information; NR cell global identifier (NCGI) information; or relay priority indication information.

In an embodiment, in a case where the first communication node supports the U2U relay function, the relay UE selection criterion information includes one of the following: an RSRP measurement value on a PC5 interface is greater than an RSRP threshold; an RSRP measurement value between the first communication node and the third communication node is the highest; a current traffic priority on a Uu interface is the highest traffic priority; a current traffic priority on the PC5 interface is the highest priority; domain address indication information in SCI information; a resource scheduling mode is a pre-configured mode; Uu RAT indication information; NCGI information; or relay priority indication information.

Figure 3:
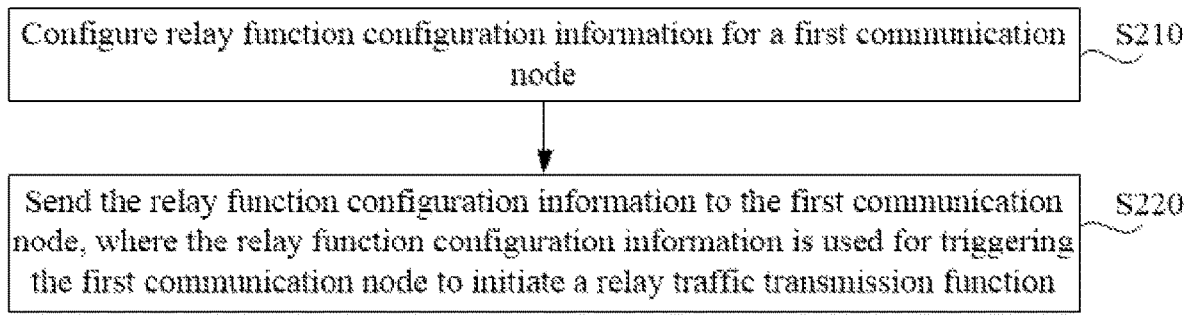
FIG. 3 is a flowchart of another initiation method according to an embodiment of the present application.

In an embodiment, FIG. 3 is another flowchart of an initiation method according to an embodiment of the present application. This embodiment is applied by a second communication node. In this embodiment, the second communication node may be a network side, for example, a base station or an NR-RAN. As shown in FIG. 3, this embodiment includes S210 and S220.

In S210, relay function configuration information is configured for a first communication node.

In S220, the relay function configuration information is sent to the first communication node; where the relay function configuration information is used for triggering the first communication node to initiate a relay traffic transmission function.

In an embodiment, the second communication node configures the relay function configuration information for the first communication node and sends the relay function configuration information to the first communication node so that the first communication node determines whether to initiate its own relay function according to the relay function configuration information.

In an embodiment, the initiation method applied by the second communication node further includes: relay UE selection criterion information is configured for a third communication node.

In an embodiment, the relay function configuration information includes at least one of the following information: U2N relay function configuration information or U2U relay function configuration information.

In an embodiment, whether the second communication node supports the U2N relay function is determined in at least one of the following manners.

Configuration information related to the U2N relay function is received within a current coverage range of the second communication node, where the configuration information is included in a SIB message of V2X or an independent SIB message; indication information indicated in SIB1, SIB2 or SIB4 that a current serving cell supports the U2N relay function is received within the current coverage range of the second communication node; a PRACH resource dedicated to the U2N relay function is received within the current coverage range of the second communication node; or an access category and an access identifier dedicated to the U2N relay function are received within the current coverage range of the second communication node.

In an embodiment, a location where the U2N relay function configuration information is included includes one of the following: a SIB message of V2X, a SIB message of a U2U relay function or an independent SIB message.

In an embodiment, whether the second communication node supports the U2U relay function is determined in at least one of the following manners.

Configuration information related to the U2U relay function is received within a coverage range of the current second communication node, where the configuration information is included in a SIB message of V2X, a SIB message of U2N relay function or an independent SIB message; indication information indicated in SIB1, SIB2 or SIB4 that a current serving cell supports the U2U relay function is received within the coverage range of the current second communication node; a PRACH resource dedicated to the U2U relay function is received within the coverage range of the current second communication node; or an access category and an access identifier dedicated to the U2U relay function are received within the coverage range of the current second communication node.

In an embodiment, a location where the U2U relay function configuration information is included includes one of the following: a SIB message of V2X, a SIB message of a U2U relay function or an independent SIB message.

In an embodiment, the U2N relay function configuration information includes at least one of the following: an RSRP threshold on a Uu interface; an RSRP threshold on a sidelink interface (PC5 interface); a traffic priority threshold on the Uu interface; a traffic priority threshold on the PC5 interface; a resource pool busy-idle degree threshold; or an absolute speed threshold; where the Uu interface is an interface between the first communication node and the second communication node.

In an embodiment, the U2U relay function configuration information includes at least one of the following: an RSRP threshold on a Uu interface; an RSRP threshold on a PC5 interface; a traffic priority threshold on the Uu interface; a traffic priority threshold on the PC5 interface; a resource pool busy-idle degree threshold; or an absolute speed threshold.

In an embodiment, the initiation method applied by the second communication node further includes: relay UE selection criterion information is configured for the first communication node.

In an embodiment, in a case where the first communication node supports the U2N relay function, the relay UE selection criterion information includes one of the following: an RSRP measurement value on a PC5 interface is greater than an RSRP threshold; a current traffic priority on a Uu interface is the highest traffic priority; a current traffic priority on the PC5 interface is the highest priority; domain address indication information in SCI information; a resource scheduling mode is a pre-configured mode; Uu RAT indication information; NCGI information; or relay priority indication information.

In an embodiment, in a case where the first communication node supports the U2U relay function, the relay UE selection criterion information includes one of the following: an RSRP measurement value on a PC5 interface is greater than an RSRP threshold; an RSRP measurement value between the first communication node and the third communication node is the highest; a current traffic priority on a Uu interface is the highest traffic priority; a current traffic priority on the PC5 interface is the highest priority; domain address indication information in SCI information; a resource scheduling mode is a pre-configured mode; Uu RAT indication information; NCGI information; or relay priority indication information.

In an embodiment, for the explanation of the relay function configuration information and the relay UE selection criterion information, reference may be made to the description in the initiation method applied by the first communication node, and details will not be repeated here.

Figure 4:
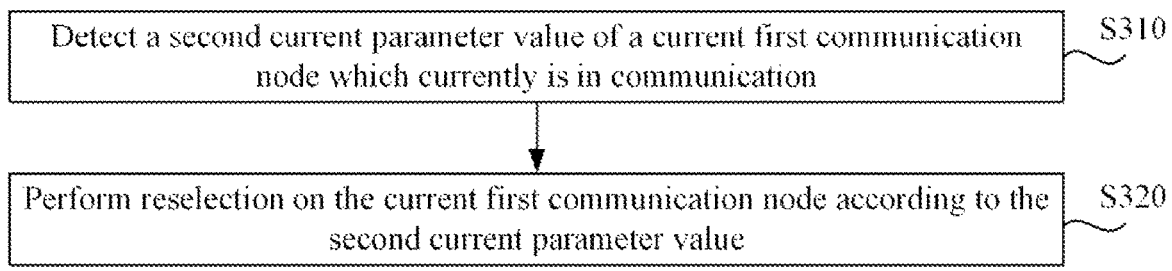
FIG. 4 is a flowchart of a reselection method according to an embodiment of the present application.

In an embodiment, in a process where the third communication node selects a relay UE1 to perform the relay traffic transmission, when the relay UE1 is no longer suitable to perform the relay traffic transmission due to some reasons, the third communication node may reselect the relay UE. In view of the above issue, an embodiment provides a reselection method. FIG. 4 is a flowchart of a reselection method according to an embodiment of the present application. This embodiment is applied by a third communication node. For example, the third communication node may be a remote UE. As shown in FIG. 4, the reselection method provided in this embodiment includes S310 and S320.

In S310, a second current parameter value of a current first communication node which currently is in communication is detected.

In S320, reselection is performed on the current first communication node according to the second current parameter value.

In this embodiment, the third communication node detects the second parameter value of the current first communication node which currently is in a communication node of the third communication node and determines whether to perform reselection on the current first communication node according to the second current parameter value, thereby ensuring the normal transmission of relay traffic.

In an embodiment, in a case where the first communication node accesses a network, the second current parameter value includes at least one of the following: an RSRP measurement value on a Uu interface is less than an RSRP threshold on the Uu interface; a current electric quantity is less than a preset electric quantity threshold; an RSRP measurement value on a PC5 interface between the first communication node and the third communication node is less than an RSRP threshold on the PC5 interface; a traffic priority on the Uu interface is greater than a traffic priority threshold on the Uu interface; or a traffic priority on the PC5 interface is greater than a traffic priority threshold on the PC5 interface.

In an embodiment, in a case where the first communication node accesses a UE, the second current parameter value includes at least one of the following: an RSRP measurement value on a Uu interface is less than an RSRP threshold on the Uu interface; a current electric quantity is less than a preset electric quantity threshold; an RSRP measurement value on a PC5 interface between the first communication node and the third communication node is less than an RSRP threshold on the PC5 interface; a traffic priority on the Uu interface is greater than a traffic priority threshold on the Uu interface; a traffic priority on the PC5 interface is greater than a traffic priority threshold on the PC5 interface; an RSRP measurement value between the first communication node and the opposite third communication node is less than the RSRP threshold on the PC5 interface; Uu RAT indication information; NCGI information; or relay priority indication information.

In an embodiment, the reselection method applied by the third communication node further includes: a discovery message, a connection establishment request message or a connection establishment response message sent by another first communication node other than the first communication node which is currently in communication is detected, and reselection is performed on the first communication node according to a first preset message carried in the discovery message, the connection establishment request message or the connection establishment response message.

In an embodiment, in a case where the first communication node accesses a network, the first preset message includes at least one of the following: a traffic priority on a Uu interface is less than the traffic priority of the first communication node which is currently in communication; a traffic priority on a PC5 interface is less than the traffic priority of the first communication node which is currently in communication; an RSRP measurement value is greater than an RSRP measurement value between the first communication node which is currently in communication and the third communication node; a zone identifier (ID) information in an SCI message indicates the nearest node; a resource scheduling mode is a priority mode; Uu RAT indication information; NCGI information; or relay priority indication information.

In an embodiment, in a case where the first communication node accesses a UE, the first preset message includes at least one of the following: a traffic priority on a Uu interface is less than the traffic priority of the first communication node which is currently in communication; a traffic priority on a PC5 interface is less than the traffic priority of the first communication node which is currently in communication; an RSRP measurement value is greater than an RSRP measurement value between the first communication node which is currently in communication and the third communication node; a zone ID information in an SCI message indicates the nearest node; a resource scheduling mode is a priority mode; Uu RAT indication information; NCGI information; or relay priority indication information.

In an embodiment, whether the second communication node supports the relay function is described using an example where the first communication node accesses a network, that is, the relay UE accesses a network.

In order to enable an NR sidelink UE to become a U2N relay UE, the network side supports the U2N relay function of the NR, that is, the network side satisfies at least one of the following conditions.

Configuration information related to the U2N relay function is received within a current coverage range of the second communication node, where the configuration information is included in a SIB message of V2X or an independent SIB message; indication information indicated in SIB1, SIB2 or SIB4 that a current serving cell supports the U2N relay function is received within the current coverage range of the second communication node; a PRACH resource dedicated to the U2N relay function is received within the current coverage range of the second communication node; or an access category and an access identifier dedicated to the U2N relay function are received within the current coverage range of the second communication node.

In an embodiment, in a case where the network side can broadcast U2N relay function-related configuration information in a cell, the cell is the cell supporting the U2N relay function. In an embodiment, the U2N relay function-related configuration information may be included in the SIB message of V2X, or the U2N relay function-related configuration information may be included in an independent SIB message.

If the network side supports the U2N relay function, the indication information (the indication information is used for indicating that the current serving cell supports the U2N relay function) may be carried in SIB1, SIB2 or SIB4, a UE reads the indication information in SIB1, SIB2 or SIB4, and an access cell enters the connected state and acquires the U2N relay function-related configuration information through a proprietary signaling.

The network side may configure a PRACH resource dedicated to the U2N relay function for the relay UE.

In an embodiment, the network side may configure the access category and the access identifier dedicated to the U2N relay function for the relay UE.

In order to enable an NR sidelink UE to become a U2U relay UE, the network side (for example, a base station) supports the U2U relay function of the NR, that is, the network side satisfies at least one of the following conditions.

Configuration information related to the U2U relay function is received within a coverage range of the current second communication node, where the configuration information is included in a SIB message of V2X, a SIB message of U2N relay function or an independent SIB message; indication information indicated in SIB1, SIB2 or SIB4 that a current serving cell supports the U2U relay function is received within the coverage range of the current second communication node; a PRACH resource dedicated to the U2U relay function is received within the coverage range of the current second communication node; or an access category and an access identifier dedicated to the U2U relay function are received within the coverage range of the current second communication node.

In an embodiment, in a case where the network side can broadcast U2U relay function-related configuration information in a cell, the cell is the cell supporting the U2U relay function. In an embodiment, the U2U relay function-related configuration information may be included in the SIB message of V2X, the U2U relay function-related configuration information may be included in the SIB message of the U2N relay function, or the U2U relay function-related configuration information may be included in an independent SIB message.

If the network side supports the U2U relay function, the indication information (the indication information is used for indicating that the current serving cell supports the U2U relay function) may be carried in SIB1, SIB2 or SIB4, a UE reads the indication information in SIB1, SIB2 or SIB4, and an access cell enters the connected state and acquires the U2U relay function-related configuration information through a proprietary signaling.

The network side may configure a PRACH resource dedicated to the U2U relay function for the relay UE.

The network side may configure the access category and the access identifier dedicated to the U2U relay function for the relay UE.

In an embodiment, in a case where the relay UE performs cell selection, a frequency point supporting the relay function is selected according to the location where the relay function configuration information is included.

In an embodiment, in a case where the relay function configuration information is the U2N relay function configuration information, when the relay UE performs cell selection, the relay UE preferentially selects a frequency point that can be granted and supports the U2N relay function, and the operation includes one of the following.

In a case where the U2N relay function configuration information is included in the independent SIB message, a frequency point supporting the U2N relay function is preferentially selected. In an embodiment, if the U2N relay function configuration information is included in the independent SIB message and the UE is capable of performing the traffic of the U2N relay function, the UE preferentially selects the frequency point supporting the U2N relay function.

In a case where the U2N relay function configuration information is included in the SIB message of V2X, a frequency point supporting both the U2N relay function and NR V2X is preferentially selected. In an embodiment, if the U2N relay function configuration information is included in the V2X-related SIB message and the UE is capable of performing the traffic of the U2N relay function, the UE preferentially selects the frequency point supporting both the U2N relay function and NR V2X.

In an embodiment, in a case where the relay function configuration information is the U2U relay function configuration information, when the relay UE performs cell selection, the relay UE preferentially selects a frequency point that can be granted and supports the U2U relay function, and the operation includes one of the following.

In a case where the U2U relay function configuration information is included in the independent SIB message, a frequency point supporting the U2U relay function is preferentially selected. In an embodiment, if the U2U relay function configuration information is included in the independent SIB message and the UE is capable of performing the traffic of the U2U relay function, the UE preferentially selects the frequency point supporting the U2U relay function.

In a case where the U2U relay function configuration information is included in the SIB message of V2X, a frequency point supporting both the U2U relay function and NR V2X is preferentially selected. In an embodiment, if the U2U relay function configuration information is included in the V2X-related SIB message and the UE is capable of performing the traffic of the U2U relay function, the UE preferentially selects the frequency point supporting both the U2U relay function and NR V2X.

In a case where the U2U relay function configuration information is included in the SIB message of the U2N relay function, a frequency point supporting both the U2U relay function and the U2N relay function is preferentially selected. In an embodiment, if the U2U relay function configuration information is included in the U2N relay function-related SIB message and the UE is capable of performing the traffic of the U2U relay function, the UE preferentially selects the frequency point supporting both the U2U relay function and the U2N relay function.

In a case where the U2U relay function configuration information is included in the SIB message of the U2N relay function and the SIB message of V2X, a frequency point supporting all the U2U relay function, the U2N relay function and NR V2X is preferentially selected. In an embodiment, if the U2U relay function configuration information is included in the U2N relay function-related SIB message and the V2X-related SIB message and the UE is capable of performing the traffic of the U2U relay function, the UE preferentially selects the frequency point supporting all the U2U relay function, the U2N relay function and NR V2X.

In an embodiment, in order to trigger the activation of the relay UE, a base station configures the corresponding relay function configuration information for the relay UE to assist the relay UE in determining whether its current parameter value complies with the relay function configuration information of the relay UE. In an embodiment, after the relay UE accesses a network, the base station provides the relay function configuration information for the relay UE to assist the relay UE in determining whether the relay UE itself is currently suitable to act as the relay UE.

In an embodiment, the U2N relay function configuration information includes at least one of the following: an RSRP threshold on a Uu interface; an RSRP threshold on a PC5 interface; a traffic priority threshold on the Uu interface; a traffic priority threshold on the PC5 interface; a resource pool busy-idle degree threshold; or an absolute speed threshold; where the Uu interface is an interface between the first communication node and the second communication node.

In an embodiment, the base station may configure an RSRP threshold on the Uu interface for the UE, including a maximum threshold and/or a minimum threshold. In an embodiment, in order to avoid the ping-pong effect, a hysteresis value may be included. In a case where the RSRP measurement value, which is measured by the UE, on the Uu interface is less than or equal to the maximum threshold minus the hysteresis value and/or greater than or equal to the minimum threshold plus the hysteresis value, the UE may become the relay UE. After the UE becomes the relay UE, when the RSRP measurement value, which is measured by the UE, on the Uu interface is greater than or equal to the maximum threshold plus the hysteresis value or less than or equal to the minimum threshold minus the hysteresis value, the UE cannot act as the relay UE.

In an embodiment, the base station may configure an RSRP threshold on the PC5 interface for the UE, including a maximum threshold and a minimum threshold. In a case where the UE measures an RSRP of the direct communication request message or discovery message sent by another UE, when the RSRP measurement value is less than or equal to the maximum threshold and is greater than or equal to the minimum threshold, the UE may become the relay UE to ensure the link quality in the process of the transmission of the relay UE, thereby ensuring the traffic transmission reliability.

In an embodiment, the base station may configure a traffic priority threshold (for example, the priority indication may be a 5th generation mobile communication system quality of service identifier (5G QoS ID, 5QI) on the PC5 interface (PQI), a 5QI or a priority) on the Uu interface for the UE. When all traffic priority thresholds of the UE on the Uu interface are higher than the traffic priority threshold (the higher the priority value, the lower the traffic priority), the UE may become the relay UE.

In an embodiment, the base station may configure a traffic priority threshold (for example, the priority indication may be a PQI, a 5QI or a priority) on the PC5 interface for the UE. When all non-relay traffic priority values of the UE on the PC5 interface are greater than the traffic priority threshold (the higher the priority value, the lower the traffic priority), the UE may become the relay UE.

In an embodiment, the base station may configure a resource pool busy-idle degree threshold (channel busy rate (CBR) threshold) for the UE. When a busy-idle degree measurement value measured by the UE on a resource pool configured by the base station is less than the configured resource pool busy-idle degree threshold, the UE may use the resource pool to transmit the relay traffic so that a probability that the UE selects resources collided with another UE during transmission can be avoided, thereby ensuring the transmission reliability of the UE.

In an embodiment, the base station may configure an absolute speed threshold for the UE. When the traveling speed of the UE is less than the configured absolute speed threshold, the UE may become the relay UE.

In an embodiment, the U2U relay function configuration information includes at least one of the following: an RSRP threshold on a Uu interface; an RSRP threshold on a PC5 interface; a traffic priority threshold on the Uu interface; a traffic priority threshold on the PC5 interface; a resource pool busy-idle degree threshold; or an absolute speed threshold.

In an embodiment, the base station may configure an RSRP threshold on the Uu interface for the UE, including a maximum threshold and/or a minimum threshold. In an embodiment, in order to avoid the ping-pong effect, a hysteresis value may be included. In a case where the RSRP measurement value, which is measured by the UE, on the Uu interface is less than or equal to the maximum threshold minus the hysteresis value and/or greater than or equal to the minimum threshold plus the hysteresis value, the UE may become the relay UE. After the UE becomes the relay UE, when the RSRP measurement value, which is measured by the UE, on the Uu interface is greater than or equal to the maximum threshold plus the hysteresis value or less than or equal to the minimum threshold minus the hysteresis value, the UE cannot act as the relay UE to ensure the link quality in the process of the transmission of the relay UE, thereby ensuring the traffic transmission reliability.

In an embodiment, the base station may configure an RSRP threshold on the PC5 interface for the UE, including a maximum RSRP threshold and/or a minimum RSRP threshold between the UE and a remote UE1 and a maximum RSRP threshold and/or a minimum RSRP threshold between the UE and a remote UE2. In an embodiment, in order to avoid the ping-pong effect, a hysteresis value may be included. In an embodiment, in a case where the RSRP measurement between the UE and the remote UE1 is greater than or equal to the configured minimum RSRP threshold plus the hysteresis value and less than or equal to the configured maximum RSRP threshold minus the hysteresis value and the RSRP measurement between the UE and the remote UE2 is greater than or equal to the configured minimum RSRP threshold plus the hysteresis value and less than or equal to the configured maximum RSRP threshold minus the hysteresis value, the UE may become the relay UE to ensure the link quality in the process of the transmission of the relay UE, thereby ensuring the traffic transmission reliability.

In an embodiment, the base station may configure a traffic priority threshold (for example, the priority indication may be a PQI, a 5QI or a priority) on the Uu interface for the UE. When all traffic priority values of the UE on the Uu interface are greater than the traffic priority threshold (the higher the priority value, the lower the traffic priority), the UE may become the relay UE.

In an embodiment, the base station may configure a traffic priority threshold (for example, the priority indication may be a PQI, a 5QI or a priority) on the PC5 interface for the UE. When all non-relay traffic priority values of the UE on the PC5 interface are greater than the traffic priority threshold (the higher the priority value, the lower the traffic priority), the UE may become the relay UE.

In an embodiment, the base station may configure a resource pool busy-idle degree threshold for the UE. When a busy-idle degree measurement value measured by the UE on a configured resource pool is less than the configured resource pool busy-idle degree threshold, the UE may use the resource pool to transmit the relay traffic so that a probability that the UE selects resources collided with another UE during transmission can be avoided, thereby ensuring the transmission reliability of the UE.

In an embodiment, the base station may configure an absolute speed threshold for the UE. When the traveling speed of the UE is less than the configured absolute speed threshold, the UE may become the relay UE.

In an embodiment, for the relay function configuration information, the configuration information of the RSRP threshold on the PC5 interface, the traffic priority threshold on the PC5 interface and the resource pool busy-idle degree threshold described in the preceding embodiments may also be delivered to a UE which is out of the coverage in a pre-configured manner.

In an embodiment, the first communication node satisfies pre-configured relay UE selection criterion information or relay UE selection criterion information configured by the second communication node. In an embodiment, in a case where the third communication node (for example, a remote UE) initially selects the relay UE, the remote UE may read the pre-configured relay UE selection criterion information or the relay UE selection criterion information configured by the base station to select the relay UE that satisfies the following conditions.

In an embodiment, in a case where the first communication node supports the U2N relay function, the relay UE selection criterion information includes one of the following: an RSRP measurement value on a PC5 interface is greater than an RSRP threshold; a current traffic priority on a Uu interface is the highest traffic priority; a current traffic priority on the PC5 interface is the highest priority; domain address indication information in SCI information; a resource scheduling mode is a pre-configured mode; Uu RAT indication information; NCGI information; or relay priority indication information.

In an embodiment, the relay UE selection criterion information is that the RSRP measurement value on the PC5 interface is greater than the RSRP threshold. In an embodiment, the base station configures an RSRP threshold on the PC5 interface for the remote UE, and the remote UE performs PC5 interface RSRP measurement on surrounding relay UEs to obtain the RSRP measurement value on the PC5 interface. In an embodiment, relay UEs each send a discovery message, a direct communication request message or a direct communication response message, and all relay UEs whose RSRP measurement value is greater than the RSRP threshold are selected as candidate relay UEs. The remote UE may sort the RSRP measurement values of the candidate relay UEs and select the candidate relay UE corresponding to the largest RSRP measurement value as the finally selected relay UE.

In an embodiment, the relay UE selection criterion information is that the traffic priority on the Uu interface is the highest traffic priority. Relay UEs each carry a Uu interface current highest traffic priority indication (for example, the priority indication may be a PQI, a 5QI or a priority) in a discovery message, a connection establishment request message or a connection establishment response message. The remote UE reads the highest priority indications in the discovery messages of surrounding relay UEs and selects the relay UE corresponding to the largest priority indication (the larger the priority indication value, the lower the traffic priority of the Uu interface of the relay UE).

In an embodiment, the relay UE selection criterion information is that the current traffic priority on the PC5 interface is the highest traffic priority. In an embodiment, relay UEs each carry a PC5 interface current highest traffic priority indication (for example, the priority indication may be a PQI, a 5QI or a priority) in a discovery message, a connection establishment request message or a connection establishment response message. The remote UE reads the highest priority indications in the discovery messages, connection establishment request messages or connection establishment response messages of surrounding relay UEs and selects the relay UE corresponding to the largest priority indication (the larger the priority indication value, the lower the traffic priority of the PC5 interface of the relay UE).

In an embodiment, the relay UE selection criterion information is the domain address indication information in the SCI information. In an embodiment, the remote UE reads SCI information carried by surrounding relay UEs when the surrounding relay UEs send discovery messages, connection establishment request messages or connection establishment response messages, reads indication information of domain addresses (zone IDs) in which the relay UEs are located from the SCI information, and preferentially selects the relay UE closest to the remote UE itself.

In an embodiment, the relay UE selection criterion information is that the resource scheduling mode is the pre-configured mode. For example, the pre-configured mode may be mode 1 or mode 2. In an embodiment, relay UEs each carry their own resource scheduling modes in a discovery message, a connection establishment request message or a connection establishment response message. After the remote UE reads the discovery messages of the relay UEs, the remote UE preferentially selects the relay UE in mode 1 or the relay UE in mode 2 according to its own resource scheduling mode.

In an embodiment, the relay UE selection criterion information is Uu RAT indication information, current NCGI information or relay priority indication information. In an embodiment, relay UEs each carry a Uu RAT indication (for example, long-term evolution (LTE), NR, a multi-rat dual connectivity (MR-DC) indication or a dual connectivity (DC) type (for example, ENDC, NEDC or NGENDC)) in a discovery message, a discovery additional message, a connection establishment request message or a connection establishment response message, and the UE selects an appropriate relay UE according to its own capability; an NCGI (a relay UE current serving cell identifier); or a relay priority indication indicating the degree of priority to serve as the relay (for example, the higher the priority, the more excellent the relay, for example, the relay is fully powered, the Uu interface traffic is a little, or the Uu interface has no high-priority traffic). In an embodiment, ENDC refers to dual connectivity of a 4G radio access network (RAN) and 5G NR; NEDC refers to dual connectivity of 5G NR and 4G RAN; NGENDC refers to dual connectivity of 4G RAN and 5G NR under a 5G core network.

In an embodiment, in a case where the third communication node (for example, a remote UE) initially selects the relay UE, the remote UE may read the pre-configured relay selection criterion information or the relay selection criterion information configured by the base station to select the relay UE that satisfies the following conditions. In a case where the first communication node supports the U2U relay function, the relay selection criterion information includes one of the following: an RSRP measurement value on a PC5 interface is greater than an RSRP threshold; an RSRP measurement value between the first communication node and the third communication node is the highest; a current traffic priority on a Uu interface is the highest traffic priority; a current traffic priority on the PC5 interface is the highest priority; domain address indication information in SCI information; a resource scheduling mode is a pre-configured mode; Uu RAT indication information; NCGI information; or relay priority indication information.

In an embodiment, the relay UE selection criterion information is that the RSRP measurement value on the PC5 interface is greater than the RSRP threshold. In an embodiment, the remote UE performs PC5 interface RSRP measurement on the discovery messages, connection establishment request messages or connection establishment response messages sent by all surrounding relay UEs. The remote UE may sort the RSRP measurement values of candidate relay UEs and select the candidate relay UE corresponding to the largest RSRP measurement value as the finally selected relay UE.

In an embodiment, the relay UE selection criterion information is the RSRP measurement value between the first communication node and the third communication node is the highest. In an embodiment, relay UEs each carry an RSRP measurement between them and a remote UE2 in a discovery message, a connection establishment request message or a connection establishment response message, and the remote UE1 may select the relay UE carrying the maximum RSRP measurement value.

In an embodiment, the relay UE selection criterion information is that the current traffic priority on the Uu interface is the highest traffic priority. In an embodiment, relay UEs each carry a Uu interface current highest traffic priority indication in a discovery message, a connection establishment request message or a connection establishment response message. The remote UE reads the highest priority indications in the discovery messages, connection establishment request messages or connection establishment response messages of surrounding relay UEs and selects the relay UE corresponding to the largest priority indication (the larger the priority indication value, the lower the traffic priority of the PC5 interface of the relay UE).

In an embodiment, the relay UE selection criterion information is that the current traffic priority on the PC5 interface is the highest traffic priority. In an embodiment, relay UEs each carry a PC5 interface current highest traffic priority indication (for example, the priority indication may be a PQI, a 5QI or a priority) in a discovery message, a connection establishment request message or a connection establishment response message. The remote UE reads the highest priority indications in the discovery messages, connection establishment request messages or connection establishment response messages of surrounding relay UEs and selects the relay UE corresponding to the largest priority indication (the larger the priority indication value, the lower the traffic priority of the PC5 interface of the relay UE).

In an embodiment, the relay UE selection criterion information is the domain address indication information in the SCI information. In an embodiment, the remote UE reads SCI information carried by surrounding relay UEs when the surrounding relay UEs send discovery messages, connection establishment request messages or connection establishment response messages, reads indication information of the zone IDs in which the relay UEs are located from the SCI information, and preferentially selects the relay UE closest to the remote UE itself.

In an embodiment, the relay UE selection criterion information is that the resource scheduling mode is the pre-configured mode. In an embodiment, relay UEs each carry their own resource scheduling modes in discovery messages, connection establishment request messages or connection establishment response messages. After the remote UE reads the discovery messages of the relay UEs, the remote UE preferentially selects the relay UE in mode 1 or the relay UE in mode 2 according to its own resource scheduling mode.

In an embodiment, the relay UE selection criterion information is Uu RAT indication information, NCGI information or relay priority indication information. In an embodiment, relay UEs each carry a Uu RAT indication (for example, LTE, NR, an MR-DC indication or a DC type (for example, ENDC, NEDC or NGENDC)) in a discovery message, a discovery additional message, a connection establishment request message or a connection establishment response message, and the UE selects an appropriate relay UE according to its own capability; an NCGI (a relay UE current serving cell identifier); or a relay priority indication indicating the degree of priority to serve as the relay (for example, the higher the priority, the more excellent the relay, for example, the relay is fully powered, the Uu interface traffic is a little, or the Uu interface has no high-priority traffic).

In an embodiment, in a case where the remote UE selects the relay UE1 and has performed the U2N relay traffic for a period of time, the remote UE needs to reselect the relay UE when the relay UE1 is no longer suitable to continue to assist the remote UE in forwarding the relay traffic due to certain conditions. In an embodiment, a reselection method is provided. The reselection method includes: a second current parameter value of a current first communication node which currently is in communication is detected, and reselection is performed on the current first communication node according to the second current parameter value.

In an embodiment, in a case where the relay UE accesses a network, the second current parameter value includes at least one of the following: an RSRP measurement value on a Uu interface is less than an RSRP threshold on the Uu interface; a current electric quantity is less than a preset electric quantity threshold; an RSRP measurement value on a PC5 interface between the first communication node and the third communication node is less than an RSRP threshold on the PC5 interface; a traffic priority on the Uu interface is greater than a traffic priority threshold on the Uu interface; or a traffic priority on the PC5 interface is greater than a traffic priority threshold on the PC5 interface. That is, the remote UE may actively initiate a relay UE reselection request and carry a corresponding cause value due to at least one of the following conditions: an RSRP measurement value on the Uu interface becomes poor and has already been less than the RSRP measurement threshold configured by the base station; the current electric quantity of the relay UE is too low and has a power saving requirement; an RSRP measurement value on the PC5 interface between the remote UE and the relay UE1 becomes poor; the relay UE1 has a demand for transmitting data on a high-priority Uu interface (for example, the priority indication may be a PQI, a 5QI or a priority), where the traffic priority on the Uu interface has exceeded the traffic priority threshold on the Uu interface previously configured by the base station; or the relay UE1 has a demand for transmitting data on a high-priority PC5 interface (for example, the priority indication may be a PQI, a 5QI or a priority), where the traffic priority on the PC5 interface has exceeded the traffic priority threshold on the PC5 interface previously configured by the base station.

In an embodiment, the reselection of the relay UE may also be initiated by the remote UE itself. In an embodiment, when the remote UE has established a PC5-S/radio resource control (RRC) connection with the relay UE1, the remote UE continuously monitors the discovery message, connection establishment request message or connection establishment response message sent by another surrounding relay UE and determines whether another surrounding relay UEs is more suitable to act as the relay UE than the current relay UE1 according to some conditions. In an embodiment, the reselection method applied by the third communication node further includes: a discovery message, a connection establishment request message or a connection establishment response message sent by another first communication node other than the first communication node which is currently in communication is detected, and reselection is performed on the first communication node according to a first preset message carried in the discovery message, the connection establishment request message or the connection establishment response message.

In an embodiment, in a case where the first communication node accesses a network, the first preset message includes at least one of the following: a traffic priority on a Uu interface is less than the traffic priority of the first communication node which is currently in communication; a traffic priority on a PC5 interface is less than the traffic priority of the first communication node which is currently in communication; an RSRP measurement value is greater than an RSRP measurement value between the first communication node which is currently in communication and the third communication node; a zone ID information in an SCI message indicates the nearest node; a resource scheduling mode is a priority mode; Uu RAT indication information; NCGI information; or relay priority indication information.

In an embodiment, the discovery message carries the priority indication of the Uu interface traffic with the highest priority of the current relay UE, and the remote UE compares the priority indication with the Uu interface traffic priority of the relay UE1. If the Uu interface traffic priority of another relay UE is lower than the traffic priority of the relay UE1, the remote UE may reselect another relay UE.

In an embodiment, the discovery message carries the priority indication of the PC5 interface traffic with the highest priority of the current relay UE, and the remote UE compares the priority indication with the PC5 interface traffic priority of the relay UE1. If the PC5 interface traffic priority of another relay UE is lower than the traffic priority of the relay UE1, the remote UE may reselect another relay UE.

In an embodiment, when the RSRP measurement value, measured by the remote UE, of the discovery message, the connection establishment request message or the connection establishment response message sent by another relay UE is higher than the RSRP measurement value between the remote relay UE and the corresponding relay UE1, the remote UE may reselect another relay UE.

In an embodiment, the remote UE may read the zone ID information in the SCI corresponding to the discovery message, the connection establishment request message or the connection establishment response message sent by another relay UE, determines the distance between another relay UE and the remote UE, and if another relay UE is closer to the remote UE, reselect another relay UE which is the nearest.

In an embodiment, the discovery message, the connection establishment request message or the connection establishment response message may carry the resource scheduling mode information of the relay UE, the base station may configure the priority mode for the remote UE, and the remote UE may reselect the relay UE which the priority mode is configured for.

In an embodiment, relay UEs each carry a Uu RAT indication (for example, LTE, NR, an MR-DC indication or a DC type (for example, ENDC/NEDC/NGENDC)) in a discovery message, a discovery additional message, a connection establishment request message or a connection establishment response message, and the UE selects an appropriate relay UE according to its own capability; an NCGI (a relay UE current serving cell identifier); or an relay priority indication indicating the degree of priority to serve as the relay (for example, the higher the priority, the more excellent the relay, for example, the relay is fully powered, the Uu interface traffic is a little, or the Uu interface has no high-priority traffic).

In an embodiment, in a case where the remote UE1 selects the relay UE1 and the relay UE1 has connected to the remote UE2 and performed the U2U relay traffic, the remote UE1 needs to perform the reselection of the relay UE when the relay UE1 is no longer suitable to continue to assist the remote UE1 in the relay traffic due to certain conditions. In an embodiment, a reselection method is provided. The reselection method includes: a second current parameter value of a current first communication node which currently is in communication is detected, and reselection is performed on the current first communication node according to the second current parameter value.

In an embodiment, in a case where the first communication node accesses a UE, the second current parameter value includes at least one of the following: an RSRP measurement value on a Uu interface is less than an RSRP threshold on the Uu interface; a current electric quantity is less than a preset electric quantity threshold; an RSRP measurement value on a PC5 interface between the first communication node and the third communication node is less than an RSRP threshold on the PC5 interface; a traffic priority on the Uu interface is greater than a traffic priority threshold on the Uu interface; a traffic priority on the PC5 interface is greater than a traffic priority threshold on the PC5 interface; an RSRP measurement value between the first communication node and the opposite third communication node is less than the RSRP threshold on the PC5 interface; Uu RAT indication information; NCGI information; or relay priority indication information. That is, for the relay UE, the remote UE may actively initiate a relay UE reselection request or a PC5-RRC link release message and carry a corresponding cause value due to at least one of the following conditions:

an RSRP measurement value on the Uu interface becomes poor and has already been less than the RSRP measurement threshold configured by the base station; the current electric quantity of the relay UE is too low and has a power saving requirement; an RSRP measurement value on the PC5 interface between the remote UE and the relay UE1 becomes poor; the relay UE1 has a demand for transmitting data on a high-priority Uu interface, where the traffic priority on the Uu interface has exceeded the traffic priority threshold on the Uu interface previously configured by the base station; the relay UE1 has a demand for transmitting data on a high-priority PC5 interface, where the traffic priority on the PC5 interface has exceeded the traffic priority threshold on the PC5 interface previously configured by the base station; an RSRP measurement value between the relay UE1 and the remote UE2 becomes poor and has been less than the RSRP threshold configured by the base station; relay UEs each carry a Uu RAT indication (for example, LTE, NR, an MR-DC indication or a DC type (for example, ENDC/NEDC/NGENDC)) in a discovery message, a discovery additional message, a connection establishment request message or a connection establishment response message, and the UE selects an appropriate relay UE according to its own capability; an NCGI (a relay UE current serving cell identifier); or a relay priority indication indicating the degree of priority to serve as the relay (for example, the higher the priority, the more excellent the relay, for example, the relay is fully powered, the Uu interface traffic is a little, or the Uu interface has no high-priority traffic). In an embodiment, the relay UE carries the carrier aggregation configuration of the relay UE and/or the capability of a frequency band combination in a discovery message, a discovery additional message, a connection establishment request message or a connection establishment response message.

In an embodiment, the reselection of the relay UE may also be initiated by the remote UE itself. In an embodiment, when the remote UE has established a PC5-RRC connection with the relay UE1, the remote UE continuously monitors the discovery message sent by another surrounding relay UE and determines whether another surrounding relay UEs is more suitable to act as the relay UE than the current relay UE1 according to some conditions. In an embodiment, the reselection method applied by the third communication node further includes: a discovery message, a connection establishment request message or a connection establishment response message sent by another first communication node other than the first communication node which is currently in communication is detected, and reselection is performed on the first communication node according to a first preset message carried in the discovery message, the connection establishment request message or the connection establishment response message.

In an embodiment, in a case where the first communication node accesses a UE, the first preset message includes at least one of the following: a traffic priority on a Uu interface is less than a traffic priority of the first communication node which is currently in communication; a traffic priority on a PC5 interface is less than the traffic priority of the first communication node which is currently in communication; an RSRP measurement value is greater than an RSRP measurement value between the first communication node which is currently in communication and the third communication node; a zone ID information in an SCI message indicates the nearest node; a resource scheduling mode is a priority mode; Uu RAT indication information; NCGI information; or relay priority indication information.

In an embodiment, the discovery message carries the priority indication of the Uu interface traffic with the highest priority of the current relay UE, and the remote UE compares the priority indication with the Uu interface traffic priority of the relay UE1. If the Uu interface traffic priority of another relay UE is lower than the traffic priority of the relay UE1, the remote UE may reselect another relay UE.

In an embodiment, the discovery message carries the priority indication of the PC5 interface traffic with the highest priority of the current relay UE, and the remote UE compares the priority indication with the PC5 interface traffic priority of the relay UE1. If the PC5 interface traffic priority of another relay UE is lower than the traffic priority of the relay UE1, the remote UE may reselect another relay UE.

In an embodiment, when the RSRP measurement value, measured by the remote UE, of the discovery message sent by another relay UE is higher than the RSRP measurement value between the remote relay UE and the corresponding relay UE1, the remote UE may reselect another relay UE.

In an embodiment, the remote UE may read the zone ID information in the SCI corresponding to the discovery message sent by another relay UE, determines the distance between another relay UE and the remote UE, and if another relay UE is closer to the remote UE, reselect another relay UE which is the nearest.

In an embodiment, the discovery message may carry the resource scheduling mode information of the relay UE, the base station may configure the priority mode for the remote UE, and the remote UE may reselect the relay UE which the priority mode is configured for.

In an embodiment, relay UEs each carry a Uu RAT indication (for example, LTE, NR, an MR-DC indication or a DC type (for example, ENDC/NEDC/NGENDC)) in a discovery message, a discovery additional message, a connection establishment request message or a connection establishment response message, and the UE selects an appropriate relay UE according to its own capability; an NCGI (a relay UE current serving cell identifier); or an relay priority indication indicating the degree of priority to serve as the relay (for example, the higher the priority, the more excellent the relay, for example, the relay is fully powered, the Uu interface traffic is a little, or the Uu interface has no high-priority traffic). In an embodiment, the relay UE carries the carrier aggregation configuration of the relay UE and/or the capability of a frequency band combination in a discovery message, a discovery additional message, a connection establishment request message or a connection establishment response message.

In an embodiment, in a case where the link quality between the relay UE1 and the remote UE2 becomes poor, the remote UE1 may be considered to be currently no longer suitable to perform U2U relay traffic with the remote UE2. Therefore, the remote UE1 should send a remote UE release request to the relay UE1 to instruct the relay UE1 to release the unicast link between the relay UE1 and the remote UE2, but at this point, the remote UE1 still has data that has not been sent. Therefore, the relay UE1 should perform remote UE reselection and look for a remote UE2' that is interested in the current relay traffic, and during this process, the remote UE1 has been in a waiting state. However, in order to avoid the waste of waiting time of the remote UE1 because the remote UE1 waits for a too long time or no remote UE2' around the relay UE1 is interested in the current relay traffic, the remote UE1 may configure one remote UE reselection timer for the relay UE1. When the remote UE1 instructs the relay UE1 to release the unicast connection between the relay UE1 and the remote UE2, the reselection timer starts, and when the reselection timer expires and the relay UE1 still does not find the appropriate remote UE2', the remote UE1 may consider to reelect a relay UE.

In an embodiment, in a case where the link quality between the relay UE1 and the remote UE2 becomes poor, the reselection of the relay UE is triggered by the remote UE2. In an embodiment, when the link quality between the relay UE1 and the remote UE2 becomes poor, the remote UE2 actively releases the unicast link between the remote UE2 and the relay UE1. At this point, the other surrounding relay UEs start to send discovery messages or direct communication request messages carrying the information of the remote UE1, and accordingly, the remote UE2 performs the RSRP measurement according to the discovery messages sent by the different relay UEs and selects the relay UE with the best RSRP measurement value as the new reselected relay UE.

In an embodiment, a transmission method is provided. The method is applied by a UE, and includes: sidelink security configuration information is received, and sidelink communication transmission is performed according to the sidelink security configuration information.

In an embodiment, the sidelink security configuration information includes at least one of the following: an encryption indication or an integrity protection indication.

In an embodiment, the configuration granularity of the sidelink security configuration information includes one of the following: configuring the sidelink security configuration information for a specific communication target or configuring sidelink security configuration information for each sidelink bearer.

In an embodiment, the operation where the sidelink security configuration information is received includes at least one of the following.

The sidelink security configuration information sent by a base station through an RRC proprietary signaling or a system message is received, or the sidelink security configuration information in pre-configured information is received.

In an embodiment, before the sidelink communication transmission is performed according to the sidelink security configuration information, the method further includes: the sidelink security configuration information is sent to a target UE through a PC5 RRC message.

In an embodiment, the sidelink unicast communication supports encryption and integrity protection transmission of sidelink signaling and data.

In an embodiment, for an in-coverage UE, the base station configures the sidelink security configuration information through an RRC proprietary signaling or a system message to indicate whether the sidelink unicast communication performs encryption and/or integrity protection transmission.

In an embodiment, for an out-of-coverage UE, the sidelink security configuration information is configured in the pre-configured information to indicate whether the sidelink unicast communication performs encryption and/or integrity protection transmission.

In an embodiment, the UE receives the sidelink security configuration information, and the UE performs sidelink communication transmission according to the sidelink security configuration information.

In an embodiment, the sidelink security configuration information includes at least one of the following: an encryption indication or an integrity protection indication.

In an embodiment, the configuration granularity of the sidelink security configuration information includes one of the following: configuring the sidelink security configuration information for a specific communication target or configuring sidelink security configuration information for each sidelink bearer.

In an embodiment, the operation where the UE receives the sidelink security configuration information includes at least one of the following.

The UE receives the sidelink security configuration information sent by the base station through an RRC proprietary signaling or a system message, or the UE receives the sidelink security configuration information in the pre-configured information is received.

In an embodiment, before the UE performs the sidelink communication transmission according to the sidelink security configuration information, the method further includes the following.

The UE sends the sidelink security configuration information to a target UE through a PC5 RRC message.

In an embodiment, the sidelink unicast communication supports encryption and integrity protection transmission of sidelink signaling and data.

In an embodiment, for an in-coverage UE, the base station may configure the sidelink security configuration information through an RRC proprietary signaling or a system message to indicate whether the sidelink unicast communication performs encryption and/or integrity protection transmission.

In an embodiment, for an out-of-coverage UE, the sidelink security configuration information may be configured in the pre-configured information to indicate whether the sidelink unicast communication performs encryption and/or integrity protection transmission.

In an embodiment, the sidelink security configuration information includes at least one of the following: an encryption indication or an integrity protection indication.

In an embodiment, the sidelink security configuration information may be configured for a specific communication target, that is, the sidelink security configuration information is applicable to all sidelink bearer data transmissions for the specific communication target or a specific unicast communication link; or, the sidelink security configuration information may be configured for each sidelink bearer, that is, the sidelink security configuration information is carried in sidelink bearer configuration information to indicate whether encryption and/or integrity protection transmission are performed when the current sidelink bearer data transmission is performed.

In an embodiment, the UE performs the sidelink communication transmission according to the sidelink security configuration information, and if the sidelink security configuration information indicates encryption and/or integrity protection transmission to be performed on a specific communication target or a specific sidelink bearer, the UE performs encryption and/or integrity protection transmission on all sidelink bearer data transmissions of the specific communication target or on the specific sidelink bearer data transmission.

In an embodiment, for two UEs that are to perform sidelink unicast communication, a UE may send sidelink security configuration information to a target UE through the PC5 RRC signaling to enable the target UE to perform decryption and/or integrity protection verification to correctly received data. In an embodiment, the UE receives a PC5 RRC response message sent by the target UE.

In an embodiment, this embodiment provides a priority determination method. The method includes: priority information of a sidelink channel state information (CSI) report is acquired, and a priority of a sidelink report is determined according to the priority information.

In an embodiment, the priority information of the sidelink CSI report includes: priority information of a sidelink CSI report that has not expired or priority information of a sidelink CSI report that expires.

In an embodiment, the operation where the priority information of the sidelink CSI report is acquired includes: the priority information of the sidelink CSI report is acquired in a pre-configured manner or the priority information of the sidelink CSI report is received through the network side.

In an embodiment, the priority information of the sidelink CSI report includes: a priority value of a sidelink CSI report that has not expired or a priority value of a sidelink CSI report that expires.

In an embodiment, the priority information of the sidelink CSI report includes: the priority of a sidelink CSI report that expires being the lowest or a priority logic channel of a sidelink CSI report that expires.

In an embodiment, the process of determining the priority includes operations 1 and 2 described below.

In operation 1, a UE acquires priority information of a sidelink CSI report. In operation 2, the UE determines a priority of the sidelink CSI report.

In an embodiment, the priority information of the sidelink CSI report includes: priority information of a sidelink CSI report that has not expired or priority information of a sidelink CSI report that expires.

In an embodiment, the operation where the UE acquires the priority information of the sidelink CSI report includes: the UE acquires the priority information of the sidelink CSI report in a pre-configured manner or the UE receives the priority information of the sidelink CSI report through the network side.

In an embodiment, the priority information of the sidelink CSI report includes: a priority value of a sidelink CSI report that has not expired or a priority value of a sidelink CSI report that expires.

In an embodiment, the priority information of the sidelink CSI report includes: a priority of a sidelink CSI report that expires being the lowest or a priority logic channel of a sidelink CSI report that expires.

In an embodiment, after the UE determines the priority of the sidelink CSI report, the priority of the sidelink CSI report that expires is the lowest in the process of assembling a media access control (MAC) entity.

In an embodiment, in a case where a mode2 UE performs the resource pool initial selection, for a resource pool configured by the higher layer of each UE, if the current CBR measurement value of the resource pool is less than the CBR reselection threshold corresponding to a logic channel with the highest priority among all logic channels having data to be sent of the UE, when the logic channel with the highest priority among all logic channels having data to be sent enables hybrid automatic repeat request (HARQ) feedback and the resource pool is configured with physical sidelink feedback channel (PSFCH) resources, the UE may take this resource pool as an optional candidate resource pool.

In a case where the mode2 UE performs the resource pool reselection, when the UE triggers the resource reselection and the triggering condition of the resource reselection is not that the MAC protocol data unit (PDU) assembled by the UE needs enable HARQ feedback but that the currently used resource pool is not configured with feedback resources, if the CBR measurement value of the currently used resource pool is less than the CBR camping threshold corresponding to the logic channel with the highest priority among all logic channels having data to be sent of the UE, the UE may continue to use the current resource pool.

Otherwise, if the CBR measurement value of the currently used resource pool is greater than the CBR camping threshold corresponding to the logic channel with the highest priority among all logic channels having data to be sent of the UE, for the resource pool configured by the higher layer of each UE, when the CBR measurement value of the current resource pool is less than the CBR camping threshold corresponding to the logic channel with the highest priority among all logic channels having data to be sent of the UE, the UE may take the resource pool as an optional candidate resource pool.

Otherwise, when the triggering condition of the resource reselection is that the MAC PDU assembled by the UE needs enable HARQ feedback but the currently used resource pool is not configured with feedback resources, for the resource pool configured by the higher layer of each UE, if the CBR measurement value of the current resource pool is less than the CBR camping threshold corresponding to the logic channel with the highest priority among all logic channels having data to be sent of the UE, the UE may take this resource pool as an optional candidate resource pool.

In a case where the UE has multiple candidate resource pools, the UE may select a resource pool with the lowest CBR measurement value from the multiple candidate resource pools.

Figure 5:
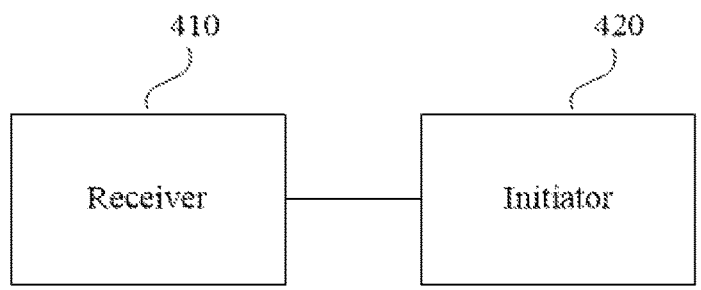
FIG. 5 is a structure diagram of an initiation apparatus according to an embodiment of the present application.

In an embodiment, FIG. 5 is a structure diagram of an initiation apparatus according to an embodiment of the present application. This embodiment is applied by a first communication node. As shown in FIG. 5, the initiation apparatus provided in this embodiment includes a receiver 410 and an initiator 420.

The receiver 410 is configured to receive relay function configuration information sent by a second communication node. The initiator 420 is configured to initiate, according to a comparison result of the relay function configuration information and a first current parameter value, a relay traffic transmission function corresponding to the comparison result, where the first current parameter value includes a current measurement value and a current traffic priority.

The initiation apparatus provided in this embodiment is configured to implement the initiation method of the embodiment shown in FIG. 2. The implementation principle and effects of the initiation apparatus provided in this embodiment are similar to those of the initiation method, and details will not be repeated herein.

In an embodiment, the relay function configuration information includes at least one of the following information: U2N relay function configuration information or U2U relay function configuration information.

In an embodiment, in a case where the first communication node is in an idle state or an inactive state for cell selection, the second communication node supporting a relay function is selected.

In an embodiment, the first communication node determines whether the second communication node supports the U2N relay function in at least one of the following manners.

Configuration information related to the U2N relay function is received within a current coverage range of the second communication node, where the configuration information is included in a SIB message of V2X or an independent SIB message; indication information indicated in SIB1, SIB2 or SIB4 that a current serving cell supports the U2N relay function is received within the current coverage range of the second communication node; a PRACH resource dedicated to the U2N relay function is received within the current coverage range of the second communication node; or an access category and an access identifier dedicated to the U2N relay function are received within the current coverage range of the second communication node.

In an embodiment, a location where the U2N relay function configuration information is included includes one of the following: a SIB message of V2X, a SIB message of a U2U relay function or an independent SIB message.

In an embodiment, the first communication node determines whether the second communication node supports the U2U relay function in at least one of the following manners.

Configuration information related to the U2U relay function is received within a coverage range of the current second communication node, where the configuration information is included in a SIB message of V2X, a SIB message of U2N relay function or an independent SIB message; indication information indicated in SIB1, SIB2 or SIB4 that a current serving cell supports the U2U relay function is received within the coverage range of the current second communication node; a PRACH resource dedicated to the U2U relay function is received within the coverage range of the current second communication node; or an access category and an access identifier dedicated to the U2U relay function are received within the coverage range of the current second communication node.

In an embodiment, a location where the U2U relay function configuration information is included includes one of the following: a SIB message of V2X, a SIB message of a U2N relay function or an independent SIB message.

In an embodiment, the initiation apparatus applied by the first communication node further includes: a selector, which is configured to select a frequency point supporting a relay function according to a location where the configuration information is included.

In an embodiment, in a case where the relay function configuration information is the U2N relay function configuration information, the operation where the frequency point supporting the relay function is selected according to the location where the configuration information is included includes one of the following.

In a case where the U2N relay function configuration information is included in an independent SIB message, a frequency point supporting the U2N relay function is preferentially selected; in a case where the U2N relay function configuration information is included in the SIB message of V2X, a frequency point supporting both the U2N relay function and NR V2X is preferentially selected.

In an embodiment, in a case where the relay function configuration information is the U2U relay function configuration information, the operation where the frequency point supporting the relay function is selected according to the location where the configuration information is included includes one of the following.

In a case where the U2U relay function configuration information is included in an independent SIB message, a frequency point supporting the U2U relay function is preferentially selected; in a case where the U2U relay function configuration information is included in the SIB message of V2X, a frequency point supporting both the U2U relay function and NR V2X is preferentially selected; in a case where the U2U relay function configuration information is included in the SIB message of the U2N relay function, a frequency point supporting both the U2U relay function and the U2N relay function is preferentially selected; or in a case where the U2U relay function configuration information is included in the SIB message of the U2N relay function and the SIB message of V2X, a frequency point supporting all the U2U relay function, the U2N relay function, and NR V2X is preferentially selected.

In an embodiment, the U2N relay function configuration information includes at least one of the following: an RSRP threshold on a Uu interface; an RSRP threshold on a sidelink interface (PC5 interface); a traffic priority threshold on the Uu interface; a traffic priority threshold on the PC5 interface; a resource pool busy-idle degree threshold; or an absolute speed threshold; where the Uu interface is an interface between the first communication node and the second communication node.

In an embodiment, the operation where, according to the comparison result of the relay function configuration information and the first current parameter value, the relay function corresponding to the comparison result is initiated includes at least one of the following.

The U2N relay function is initiated in a case where an RSRP measurement value on the Uu interface is less than or equal to an RSRP maximum threshold on the Uu interface minus a hysteresis value and/or greater than or equal to an RSRP minimum threshold on the Uu interface plus the hysteresis value; the U2N relay function is initiated in a case where an RSRP measurement value on the PC5 interface is less than or equal to an RSRP maximum threshold on the PC5 interface and greater than or equal to an RSRP minimum threshold on the PC5 interface; the U2N relay function is initiated in a case where all traffic priority values on the Uu interface are greater than or less than the traffic priority threshold on the Uu interface; the U2N relay function is initiated in a case where all non-relay traffic priority values on the PC5 interface are greater than or less than the traffic priority threshold on the PC5 interface; the U2N relay function is initiated in a case where a resource pool busy-idle degree measurement value is less than or greater than the resource pool busy-idle degree threshold; or the U2N relay function is initiated in a case where a traveling speed of the first communication node is less than or greater than the absolute speed threshold.

In an embodiment, the U2U relay function configuration information includes at least one of the following: an RSRP threshold on a Uu interface; an RSRP threshold on a PC5 interface; a traffic priority threshold on the Uu interface; a traffic priority threshold on the PC5 interface; a resource pool busy-idle degree threshold; or an absolute speed threshold.

In an embodiment, the operation where, according to the comparison result of the relay function configuration information and the first current parameter value, the relay function corresponding to the comparison result is initiated includes at least one of the following.

The U2U relay function is initiated in a case where an RSRP measurement value on the Uu interface is less than or equal to an RSRP maximum threshold on the Uu interface minus a hysteresis value and/or greater than or equal to an RSRP minimum threshold on the Uu interface plus the hysteresis value; the U2U relay function is initiated in a case where an RSRP measurement value on the PC5 interface is less than or equal to an RSRP maximum threshold on the PC5 interface and greater than or equal to an RSRP minimum threshold on the PC5 interface; the U2U relay function is initiated in a case where all traffic priority values on the Uu interface are greater than the traffic priority threshold on the Uu interface; the U2U relay function is initiated in a case where all non-relay traffic priority values on the PC5 interface are greater than the traffic priority threshold on the PC5 interface; the U2U relay function is initiated in a case where a resource pool busy-idle degree measurement value is less than the resource pool busy-idle degree threshold; or the U2U relay function is initiated in a case where a traveling speed of the first communication node is less than the absolute speed threshold.

In an embodiment, the first communication node satisfies pre-configured relay UE selection criterion information or relay UE selection criterion information configured by the second communication node.

In an embodiment, the initiation apparatus applied by the first communication node further includes: a broadcaster, which is configured to broadcast the relay UE selection criterion information to a third communication node through a discovery message or a direct communication request message.

In an embodiment, in a case where the first communication node supports the U2N relay function, the relay UE selection criterion information includes one of the following: an RSRP measurement value on a PC5 interface is greater than an RSRP threshold; a current traffic priority on a Uu interface is the highest traffic priority; a current traffic priority on the PC5 interface is the highest priority; domain address indication information in SCI information; a resource scheduling mode is a pre-configured mode; Uu RAT indication information; NCGI information; or relay priority indication information.

In an embodiment, in a case where the first communication node supports the U2U relay function, the relay UE selection criterion information includes one of the following: an RSRP measurement value on a PC5 interface is greater than an RSRP threshold; an RSRP measurement value between the first communication node and the third communication node is the highest; a current traffic priority on a Uu interface is the highest traffic priority; a current traffic priority on the PC5 interface is the highest priority; domain address indication information in SCI information; a resource scheduling mode is a pre-configured mode; Uu RAT indication information; NCGI information; or relay priority indication information.

Figure 6:
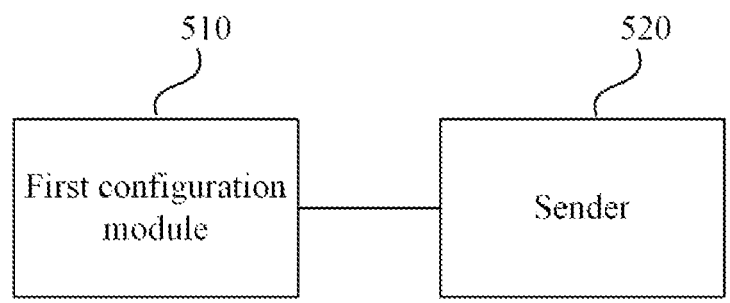
FIG. 6 is a structure diagram of another initiation apparatus according to an embodiment of the present application.

In an embodiment, FIG. 6 is another structure diagram of an initiation apparatus according to an embodiment of the present application. This embodiment is applied by a second communication node. As shown in FIG. 6, the initiation apparatus provided in this embodiment includes a first configuration module 510 and a sender 520.

The first configuration module 510 is configured to configure relay function configuration information for a first communication node, and the sender 520 is configured to send the relay function configuration information to the first communication node, where the relay function configuration information is used for triggering the first communication node to initiate a relay traffic transmission function.

The initiation apparatus provided in this embodiment is configured to implement the initiation method of the embodiment shown in FIG. 3. The implementation principle and effects of the initiation apparatus provided in this embodiment are similar to those of the initiation method, and details will not be repeated herein.

In an embodiment, the initiation apparatus applied by the second communication node further includes: a second configuration module, which is configured to configure relay UE selection criterion information for a third communication node.

In an embodiment, the relay function configuration information includes at least one of the following information: U2N relay function configuration information or U2U relay function configuration information.

In an embodiment, whether the second communication node supports the U2N relay function is determined in at least one of the following manners.

Configuration information related to the U2N relay function is received within a current coverage range of the second communication node, where the configuration information is included in a SIB message of V2X or an independent SIB message; indication information indicated in SIB1, SIB2 or SIB4 that a current serving cell supports the U2N relay function is received within the current coverage range of the second communication node; a PRACH resource dedicated to the U2N relay function is received within the current coverage range of the second communication node; or an access category and an access identifier dedicated to the U2N relay function are received within the current coverage range of the second communication node.

In an embodiment, a location where the U2N relay function configuration information is included includes one of the following: a SIB message of V2X, a SIB message of a U2U relay function or an independent SIB message.

In an embodiment, whether the second communication node supports the U2U relay function is determined in at least one of the following manners.

Configuration information related to the U2U relay function is received within a coverage range of the current second communication node, where the configuration information is included in a SIB message of V2X, a SIB message of U2N relay function or an independent SIB message; indication information indicated in SIB1, SIB2 or SIB4 that a current serving cell supports the U2U relay function is received within the coverage range of the current second communication node; a PRACH resource dedicated to the U2U relay function is received within the coverage range of the current second communication node; or an access category and an access identifier dedicated to the U2U relay function are received within the coverage range of the current second communication node.

In an embodiment, a location where the U2U relay function configuration information is included includes one of the following: a SIB message of V2X, a SIB message of a U2N relay function or an independent SIB message.

In an embodiment, the U2N relay function configuration information includes at least one of the following: an RSRP threshold on a Uu interface; an RSRP threshold on a sidelink interface (PC5 interface); a traffic priority threshold on the Uu interface; a traffic priority threshold on the PC5 interface; a resource pool busy-idle degree threshold; or an absolute speed threshold; where the Uu interface is an interface between the first communication node and the second communication node.

In an embodiment, the U2U relay function configuration information includes at least one of the following: an RSRP threshold on a Uu interface; an RSRP threshold on a PC5 interface; a traffic priority threshold on the Uu interface; a traffic priority threshold on the PC5 interface; a resource pool busy-idle degree threshold; or an absolute speed threshold.

In an embodiment, the initiation apparatus applied by the second communication node further includes: a third configuration module, which is configured to configure relay UE selection criterion information for the first communication node.

In an embodiment, in a case where the first communication node supports the U2N relay function, the relay UE selection criterion information includes one of the following: an RSRP measurement value on a PC5 interface is greater than an RSRP threshold; a current traffic priority on a Uu interface is the highest traffic priority; a current traffic priority on the PC5 interface is the highest priority; domain address indication information in SCI information; a resource scheduling mode is a pre-configured mode; Uu RAT indication information; NCGI information; or relay priority indication information.

In an embodiment, in a case where the first communication node supports the U2U relay function, the relay UE selection criterion information includes one of the following: an RSRP measurement value on a PC5 interface is greater than an RSRP threshold; an RSRP measurement value between the first communication node and the third communication node is the highest; a current traffic priority on a Uu interface is the highest traffic priority; a current traffic priority on the PC5 interface is the highest priority; domain address indication information in SCI information; a resource scheduling mode is a pre-configured mode; Uu RAT indication information; NCGI information; or relay priority indication information.

Figure 7:
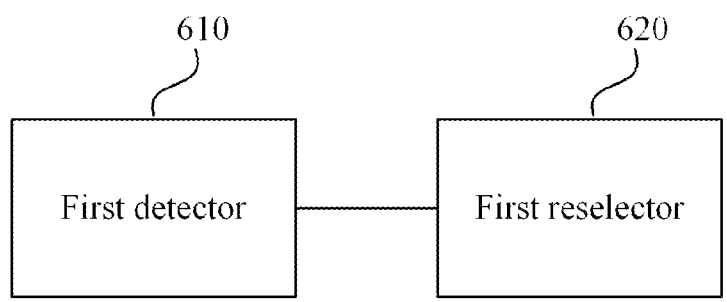
FIG. 7 is a structure diagram of a reselection apparatus according to an embodiment of the present application.

In an embodiment, FIG. 7 is a structure diagram of a reselection apparatus according to an embodiment of the present application. This embodiment is applied by a third communication node. As shown in FIG. 7, the reselection apparatus provided in this embodiment includes a first detector 610 and a first reselector 620.

The first detector 610 is configured to detect a second current parameter value of a current first communication node which currently is in communication. The first reselector 620 is configured to perform reselection on the current first communication node according to the second current parameter value.

The reselection apparatus provided in this embodiment is configured to implement the reselection method of the embodiment shown in FIG. 4. The implementation principle and effects of the reselection apparatus provided in this embodiment are similar to those of the reselection method, and details will not be repeated herein.

In an embodiment, in a case where the first communication node accesses a network, the second current parameter value includes at least one of the following: an RSRP measurement value on a Uu interface is less than an RSRP threshold on the Uu interface; a current electric quantity is less than a preset electric quantity threshold; an RSRP measurement value on a PC5 interface between the first communication node and the third communication node is less than an RSRP threshold on the PC5 interface; a traffic priority on the Uu interface is greater than a traffic priority threshold on the Uu interface; or a traffic priority on the PC5 interface is greater than a traffic priority threshold on the PC5 interface.

In an embodiment, in a case where the first communication node accesses a UE, the second current parameter value includes at least one of the following: an RSRP measurement value on a Uu interface is less than an RSRP threshold on the Uu interface; a current electric quantity is less than a preset electric quantity threshold; an RSRP measurement value on a PC5 interface between the first communication node and the third communication node is less than an RSRP threshold on the PC5 interface; a traffic priority on the Uu interface is greater than a traffic priority threshold on the Uu interface; a traffic priority on the PC5 interface is greater than a traffic priority threshold on the PC5 interface; an RSRP measurement value between the first communication node and the opposite third communication node is less than the RSRP threshold on the PC5 interface; Uu RAT indication information; NCGI information; or relay priority indication information.

In an embodiment, the reselection apparatus applied by the third communication node further includes a second detector and a second reselector. The second detector is configured to detect a discovery message, a connection establishment request message or a connection establishment response message sent by another first communication node other than the first communication node which is currently in communication. The second reselector is configured to perform reselection on the first communication node according to a first preset message carried in the discovery message, the connection establishment request message or the connection establishment response message.

In an embodiment, in a case where the first communication node accesses a network, the first preset message includes at least one of the following: a traffic priority on a Uu interface is less than the traffic priority of the first communication node which is currently in communication; a traffic priority on a PC5 interface is less than the traffic priority of the first communication node which is currently in communication; an RSRP measurement value is greater than an RSRP measurement value between the first communication node which is currently in communication; a zone ID information in an SCI message indicates a nearest node; a resource scheduling mode is a priority mode; Uu RAT indication information; NCGI information; or relay priority indication information.

In an embodiment, in a case where the first communication node accesses a UE, the first preset message includes at least one of the following: a traffic priority on a Uu interface is less than a traffic priority of the first communication node which is currently in communication; a traffic priority on a PC5 interface is less than the traffic priority of the first communication node which is currently in communication; an RSRP measurement value is greater than an RSRP measurement value between the first communication node which is currently in communication; a zone ID information in an SCI message indicates the nearest node; a resource scheduling mode is a priority mode; Uu RAT indication information; NCGI information; or relay priority indication information.

Figure 8:
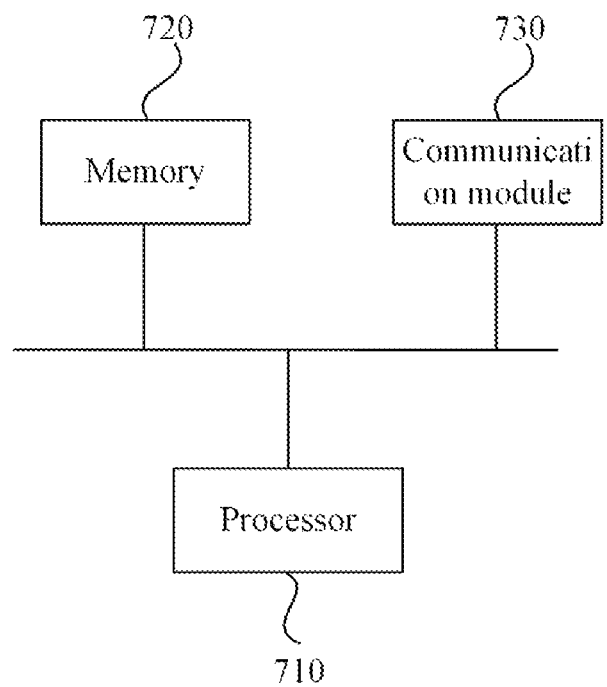
FIG. 8 is a structure diagram of a device according to an embodiment of the present application.

FIG. 8 is a structure diagram of a device according to an embodiment of the present application. As shown in FIG. 8, the device provided in the present application includes a processor 710, a memory 720 and a communication module 730. The number of processors 710 in the device may be one or more, and one processor 710 is illustrated as an example in FIG. 8. The number of memories 720 in the device may be one or more, and one memory 720 is illustrated as an example in FIG. 8. The processor 710, the memory 720 and the communication module 730 in the device may be connected via a bus or in other manners, and the connection via the bus is illustrated as an example in FIG. 8. In this embodiment, the device may be a passive optical network device.

The memory 720, as a computer-readable storage medium, may be configured to store software programs and computer executable programs and modules, such as program instructions/modules (such as a receiver and the initiator in the initiation apparatus) corresponding to the device in any embodiment of the present application. The memory 720 may include a program storage region and a data storage region. The program storage region may store an operating system and an application program required by at least one function, and the data storage region may store data created depending on use of the device. In addition, the memory 720 may include a high-speed random-access memory, and may also include a non-volatile memory such as at least one disk memory, flash memory or another non-volatile solid-state memory. In some examples, the memory 720 may include memories which are remotely disposed relative to the processor 710, and these remote memories may be connected to the device via a network. Examples of the preceding network include, but are not limited to, the Internet, an intranet, a local area network, a mobile communication network, and a combination thereof.

The communication module is configured to perform communication interaction among a first communication node, a second communication node, and a third communication node.

The preceding device may be configured to perform the initiation method applied by the first communication node in any preceding embodiment and has corresponding functions and effects.

In a case where the device is the second communication node, the preceding device may be configured to perform the reselection method applied by the second communication node in any preceding embodiment and has corresponding functions and effects.

In a case where the device is the third communication node, the preceding device may be configured to perform the reselection method applied by the third communication node in any preceding embodiment and has corresponding functions and effects.

An embodiment of the present application further provides a storage medium including computer-executable instructions. The computer-executable instructions, when executed by a computer processor, are used for performing an initiation method applied by a first communication node, and the method includes: relay function configuration information sent by a second communication node is received, and according to a comparison result of the relay function configuration information and a first current parameter value, a relay function corresponding to the comparison result is initiated, where the first current parameter value includes a current measurement value and a current traffic priority.

An embodiment of the present application further provides a storage medium including computer-executable instructions. The computer-executable instructions, when executed by a computer processor, are used for performing an initiation method applied by a second communication node, and the method includes: relay function configuration information is configured for a first communication node, and the relay function configuration information is sent to the first communication node, where the relay function configuration information is used for triggering the first communication node to initiate a relay traffic transmission function.

An embodiment of the present application further provides a storage medium including computer-executable instructions. The computer-executable instructions, when executed by a computer processor, are used for performing a reselection method applied by a third communication node, and the method includes: a second current parameter value of a current first communication node which currently is in communication is detected, and reselection is performed on the current first communication node according to the second current parameter value.

The term user equipment encompasses any suitable type of wireless user equipment, such as a mobile phone, a portable data processing apparatus, a portable web browser, or an onboard mobile station.

In general, multiple embodiments of the present application may be implemented in hardware or special-purpose circuits, software, logic, or any combination thereof. For example, some aspects may be implemented in hardware, while other aspects may be implemented in firmware or software that may be executed by a controller, a microprocessor or another computing apparatus, though the present application is not limited thereto.

The embodiments of the present application may be implemented by computer program instructions executed by a data processor of a mobile apparatus, such as in a processor entity, or by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules, and functions or may represent a combination of program steps with logic circuits, modules, and functions. A computer program may be stored in a memory. The memory may be of any type suitable for a local technical environment and may be implemented using any suitable data storage technology, such as, but not limited to, a read-only memory (ROM), a random-access memory (RAM), and an optical memory apparatus and system (a digital video disc (DVD) or a compact disc (CD)). The computer-readable media may include a non-transitory storage medium. The data processor may be of any type suitable to the local technical environment such as, but not limited to, a general-purpose computer, a special-purpose computer, a microprocessor, digital signal processing (DSP), an application-specific integrated circuit (ASIC), a field-programmable gate array (FPGA) and a processor based on a multi-core processor architecture.

What is claimed is:

1. An initiation method, applied by a first communication node, wherein the first communication node is in a connected state, an idle state or an inactive state, and the method comprises:
receiving relay function configuration information sent by a second communication node; and
initiating, according to a comparison result of the relay function configuration information and a first current parameter value, a relay function corresponding to the comparison result, wherein the first current parameter value comprises a measurement value and a traffic priority;
wherein the relay function configuration information comprises: user equipment (UE)-to-network relay function configuration information;
wherein the method further comprises: in a case where the first communication node is in an idle state or an inactive state for cell selection, selecting the second communication node supporting a relay function; and
wherein selecting the second communication node supporting the relay function comprises:
determining, by the first communication node, that the second communication node supports a UE-to-network relay function in at least one of following manners:
receiving a physical random access channel (PRACH) resource dedicated to the UE-to-network relay function within a coverage range of the second communication node; or
receiving an access category and an access identifier which are dedicated to the UE-to-network relay function within the coverage range of the second communication node.

2. The method of claim 1, wherein the relay function configuration information further comprises UE-to-UE relay function configuration information.

3. The method of claim 2, wherein selecting the second communication node supporting the relay function comprises:
determining, by the first communication node, that the second communication node supports a UE-to-UE relay function in at least one of following manners:
receiving the UE-to-UE relay function configuration information within a coverage range of the second communication node, wherein the configuration information is comprised in an SIB message of V2X, an SIB message of a UE-to-network relay function or an independent SIB message;
receiving indication information indicated in SIB1, SIB2 or SIB4 that a serving cell supports the UE-to-UE relay function within the coverage range of the second communication node;
receiving a PRACH resource dedicated to the UE-to-UE relay function within the coverage range of the second communication node; or
receiving an access category and an access identifier dedicated to the UE-to-UE relay function within the coverage range of the second communication node.

4. The method of claim 2, wherein the UE-to-network relay function configuration information comprises at least one of the following:
a reference signal receiving power (RSRP) threshold on a Uu interface; an RSRP threshold on a PC5 interface; a traffic priority threshold on the Uu interface; a traffic priority threshold on the PC5 interface; a channel busy rate threshold; or an absolute speed threshold; wherein the Uu interface is an interface between the first communication node and the second communication node.

5. The method of claim 4, wherein initiating, according to the comparison result of the relay function configuration information and the first current parameter value, the relay function corresponding to the comparison result comprises at least one of the following:
initiating the UE-to-network relay function in at least one of following cases: an RSRP measurement value on the Uu interface is less than or equal to an RSRP maximum threshold on the Uu interface minus a hysteresis value, or the RSRP measurement value on the Uu interface is greater than or equal to an RSRP minimum threshold on the Uu interface plus the hysteresis value;
initiating the UE-to-network relay function in a case where an RSRP measurement value on the PC5 interface is less than or equal to an RSRP maximum threshold on the PC5 interface and greater than or equal to an RSRP minimum threshold on the PC5 interface;
initiating the UE-to-network relay function in a case where all traffic priority values on the Uu interface are greater than or less than the traffic priority threshold on the Uu interface;
initiating the UE-to-network relay function in a case where all non-relay traffic priority values on the PC5 interface are greater than or less than the traffic priority threshold on the PC5 interface;
initiating the UE-to-network relay function in a case where a channel busy rate measurement value is less than or greater than the channel busy rate threshold; or
initiating the UE-to-network relay function in a case where a traveling speed of the first communication node is less than or greater than the absolute speed threshold.

6. The method of claim 2, wherein the UE-to-UE relay function configuration information comprises at least one of the following:
an RSRP threshold on a Uu interface; an RSRP threshold on a PC5 interface; a traffic priority threshold on the Uu interface; a traffic priority threshold on the PC5 interface; a channel busy rate threshold; or an absolute speed threshold.

7. The method of claim 6, wherein initiating, according to the comparison result of the relay function configuration information and the first current parameter value, the relay function corresponding to the comparison result comprises at least one of the following:
initiating a UE-to-UE relay function in at least one of following cases: an RSRP measurement value on the Uu interface is less than or equal to an RSRP maximum threshold on the Uu interface minus a hysteresis value, or an RSRP measurement value on the Uu interface is greater than or equal to an RSRP minimum threshold on the Uu interface plus the hysteresis value;

initiating the UE-to-UE relay function in a case where an RSRP measurement value on the PC5 interface is less than or equal to an RSRP maximum threshold on the PC5 interface and greater than or equal to an RSRP minimum threshold on the PC5 interface;

initiating the UE-to-UE relay function in a case where all traffic priority values on the Uu interface are greater than the traffic priority threshold on the Uu interface;

initiating the UE-to-UE relay function in a case where all non-relay traffic priority values on the PC5 interface are greater than the traffic priority threshold on the PC5 interface;

initiating the UE-to-UE relay function in a case where a channel busy rate measurement value is less than a channel busy rate threshold; or initiating the UE-to-UE relay function in a case where a traveling speed of the first communication node is less than the absolute speed threshold.

8. The method of claim 1, wherein determining, by the first communication node, that the second communication node supports a UE-to-network relay function further in at least one of following manners:

receiving the UE-to-network relay function configuration information within a coverage range of the second communication node, wherein the configuration information is comprised in a system information block (SIB) message of vehicle to everything (V2X) or an independent SIB message; or receiving indication information indicated in SIB1, SIB2 or SIB4 that a serving cell supports the UE-to-network relay function within the coverage range of the second communication node.

9. The method of claim 1, wherein a third communication node satisfies relay UE selection criterion information which is pre-configured or configured by the second communication node.

10. The method of claim 9, further comprising:

broadcasting the relay UE selection criterion information to the third communication node through a discovery message or a direct communication request message.

11. The method of claim 9, wherein, in a case where the first communication node supports a UE-to-network relay function, the relay UE selection criterion information comprises one of the following: an RSRP measurement value on a PC5 interface is greater than an RSRP threshold value; a traffic priority on a Uu interface is a highest traffic priority; a traffic priority on the PC5 interface is a highest priority; domain address indication information in synchronous cell indication (SCI) information; a resource scheduling mode is a pre-configured mode; Uu radio access technology (RAT) indication information; NR cell global identifier (NCGI) information; or relay priority indication information.

12. The method of claim 9, wherein, in a case where the first communication node supports the UE-to-UE relay function, the relay UE selection criterion information comprises one of the following: an RSRP measurement value on a PC5 interface is greater than an RSRP threshold; an RSRP measurement value between the first communication node and the third communication node is the highest; a traffic priority on a Uu interface is a highest traffic priority; a traffic priority on the PC5 interface is a highest priority; domain address indication information in SCI information; a resource scheduling mode is a pre-configured mode; Uu RAT indication information; NCGI information; or relay priority indication information.

13. An initiation method, applied by a second communication node, comprising:

configuring relay function configuration information for a first communication node;

sending the relay function configuration information to the first communication node, wherein the relay function configuration information is used for triggering the first communication node to initiate a relay traffic transmission function; and configuring relay user equipment (UE) selection criterion information for a third communication node;

wherein the relay function configuration information comprises: UE-to-network relay function configuration information; and wherein the first communication node determines that the second communication node supports a UE-to-network relay function in at least one of following manners:

receiving a physical random access channel (PRACH) resource dedicated to the UE-to-network relay function within a coverage range of the second communication node; or receiving an access category and an access identifier which are dedicated to the UE-to-network relay function within the coverage range of the second communication node.

14. A reselection method, applied by a third communication node, comprising:

detecting a second current parameter value of a first communication node which currently is in communication; and performing reselection on the first communication node according to the second current parameter value;

wherein the first communication node is configured to receive relay function configuration information sent by a second communication node, the relay function configuration information comprises: user equipment (UE)-to-network relay function configuration information; and wherein the first communication node is configured to determine that the second communication node supports a UE-to-network relay function in at least one of following manners:

receiving a physical random access channel (PRACH) resource dedicated to the UE-to-network relay function within a coverage range of the second communication node; or receiving an access category and an access identifier which are dedicated to the UE-to-network relay function within the coverage range of the second communication node.

15. The method of claim 14, wherein, in a case where the first communication node accesses a network, the second current parameter value comprises at least one of the following: a reference signal receiving power (RSRP) measurement value on a Uu interface is less than an RSRP threshold on the Uu interface; an electric quantity is less than a preset electric quantity threshold; an RSRP measurement value on a PC5 interface between the first communication node and the third communication node is less than an RSRP threshold on the PC5 interface; a traffic priority on a Uu interface is greater than a traffic priority threshold on the Uu interface; or a traffic priority on the PC5 interface is greater than a traffic priority threshold on the PC5 interface.

16. The method of claim 14, wherein, in a case where the first communication node accesses a user equipment (UE), the second current parameter value comprises at least one of the following: an RSRP measurement value on a Uu interface is less than an RSRP threshold on the Uu interface; an electric quantity is less than a preset electric quantity threshold; an RSRP measurement value on a PC5 interface between the first communication node and the third communication node is less than an RSRP threshold on the PC5 interface; a traffic priority on the Uu interface is greater than a traffic priority threshold on the Uu interface; a traffic priority on the PC5 interface is greater than a traffic priority threshold on the PC5 interface; an RSRP measurement value between the first communication node and the third communication node is less than the RSRP threshold on the PC5 interface; Uu radio access technology (RAT) indication information; new radio cell global identifier (NCGI) information; or relay priority indication information.

17. The method of claim 14, further comprising:
detecting a discovery message, a connection establishment request message or a connection establishment response message sent by a first communication node other than the first communication node which is currently in communication; and
performing reselection on the first communication node which is currently in communication according to a first preset message carried in the discovery message, the connection establishment request message or the connection establishment response message.

18. The method of claim 17, wherein, in a case where the first communication node accesses a network, the first preset message comprises at least one of the following: a traffic priority on a Uu interface is less than a traffic priority of the first communication node which is currently in communication; a traffic priority on a PC5 interface is less than the traffic priority of the first communication node which is currently in communication; an RSRP measurement value is greater than an RSRP measurement value between the first communication node which is currently in communication; a zone identifier (ID) information in a synchronous cell indication (SCI) message indicates a nearest node; a resource scheduling mode is a priority mode; Uu RAT indication information; NCGI information; or relay priority indication information.

19. The method of claim 17, wherein, in a case where the first communication node accesses a UE, the first preset message comprises at least one of the following: a traffic priority on a Uu interface is less than a traffic priority of the first communication node which is currently in communication; a traffic priority on a PC5 interface is less than the traffic priority of the first communication node which is currently in communication; an RSRP measurement value is greater than an RSRP measurement value between the first communication node which is currently in communication; a zone ID information in an SCI message indicates a nearest node; a resource scheduling mode is a priority mode; Uu RAT indication information; NCGI information; or relay priority indication information.

* * * * *